(12) United States Patent
Moriyama et al.

(10) Patent No.: US 8,025,449 B2
(45) Date of Patent: Sep. 27, 2011

(54) IMAGE PICKUP APPARATUS

(75) Inventors: Satoshi Moriyama, Osaka (JP);
Yoshiharu Tanaka, Osaka (JP);
Nobuharu Murashima, Nara (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/653,442

(22) Filed: Dec. 14, 2009

(65) Prior Publication Data
US 2010/0158504 A1 Jun. 24, 2010

(30) Foreign Application Priority Data

Dec. 24, 2008 (JP) ................................ P2008-328578

(51) Int. Cl.
*G03B 9/08* (2006.01)
(52) U.S. Cl. ...................................................... 396/465
(58) Field of Classification Search ........... 396/463–470
See application file for complete search history.

(56) References Cited

U.S. PATENT DOCUMENTS

| 3,636,850 | A | * | 1/1972 | Kikuchi et al. | 396/465 |
|---|---|---|---|---|---|
| 4,403,844 | A | * | 9/1983 | Namai | 396/465 |
| 4,487,492 | A | * | 12/1984 | Toyoda et al. | 396/466 |
| 5,446,648 | A | | 8/1995 | Abramovitch et al. | |
| 6,070,016 | A | * | 5/2000 | Kaneda | 396/64 |
| 6,542,194 | B1 | * | 4/2003 | Juen | 348/367 |
| 6,783,287 | B2 | | 8/2004 | Kudo et al. | |
| 2008/0187304 | A1 | * | 8/2008 | Hirose | 396/260 |

FOREIGN PATENT DOCUMENTS

| DE | 3303935 A | * | 10/1983 |
|---|---|---|---|
| JP | 57204532 A | * | 12/1982 |
| JP | 6-026895 A | | 2/1994 |
| JP | 2003-015190 A | | 1/2003 |

* cited by examiner

*Primary Examiner* — Clayton E Laballe
*Assistant Examiner* — Leon W Rhodes, Jr.
(74) *Attorney, Agent, or Firm* — Lerner, David, Littenberg, Krumholz & Mentlik, LLP

(57) ABSTRACT

An image pickup apparatus includes: a shutter device; an image pickup element adapted to sequentially acquire time-series images regarding object images passing through an exposure opening of the shutter device; and control section configured to control operation of the shutter device and operation of the image pickup element.

5 Claims, 14 Drawing Sheets

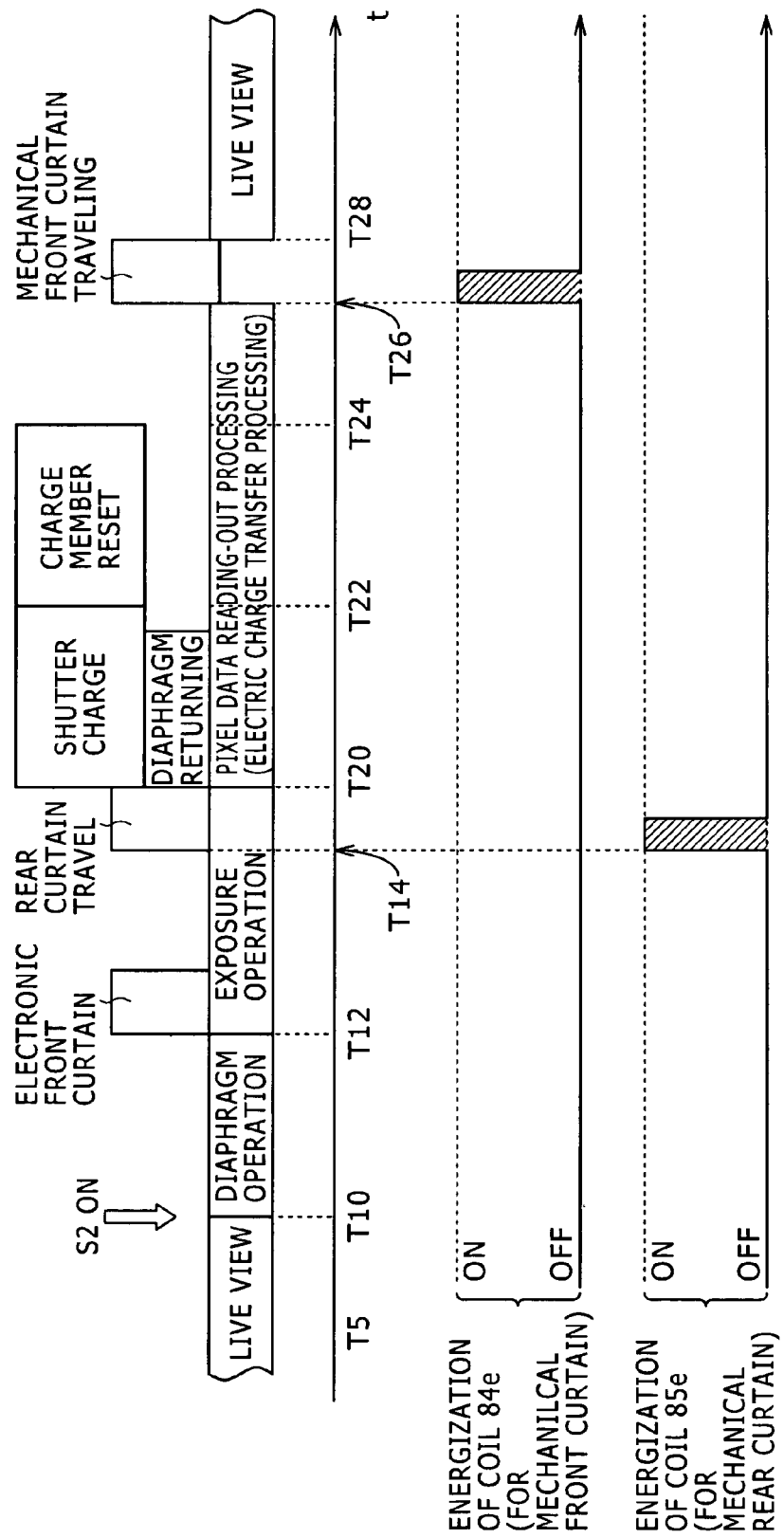

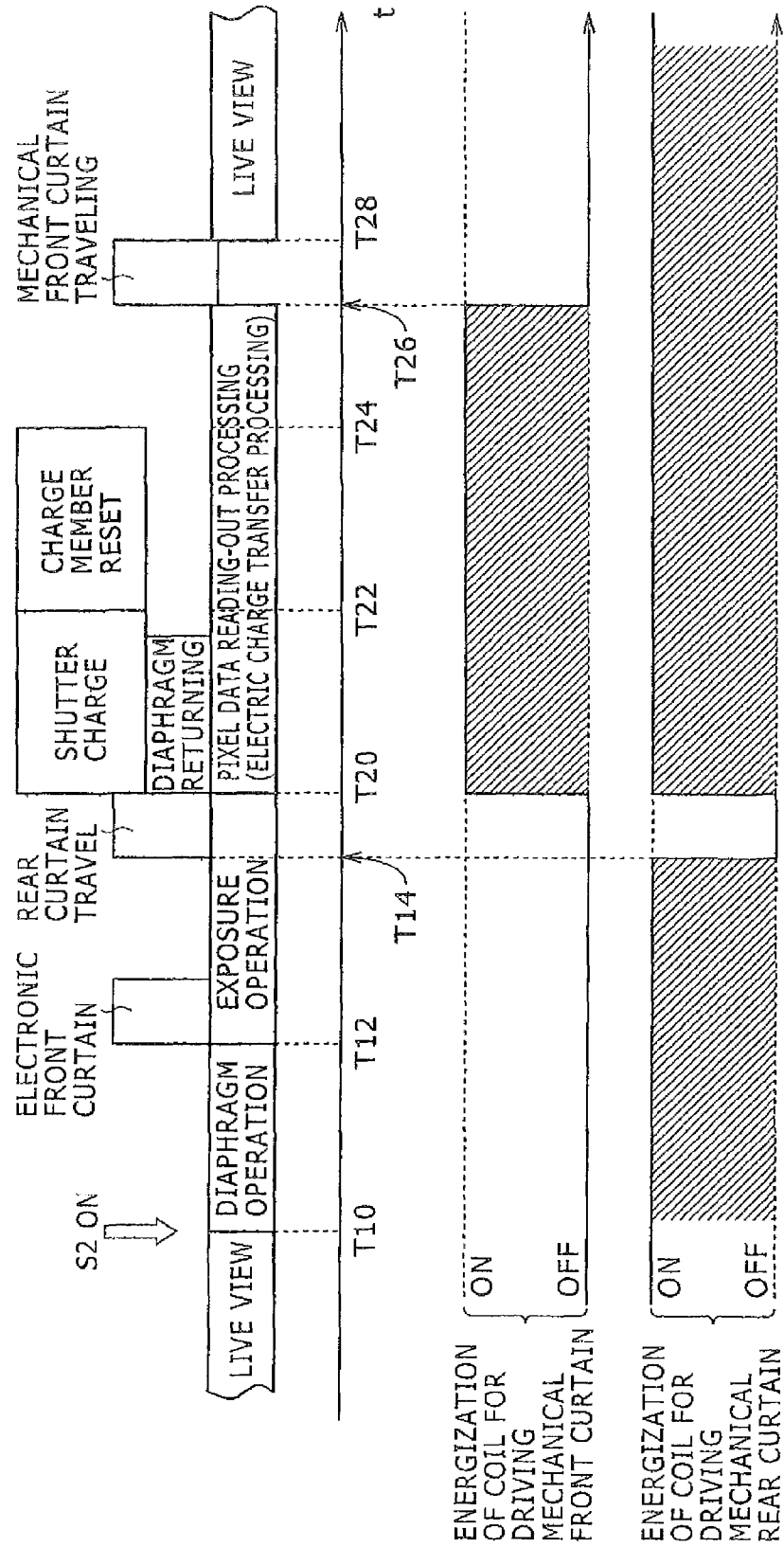

IMAGE PICKUP APPARATUS

CROSS-REFERENCE TO RELATED APPLICATION

The present application claims priority from Japanese Patent Application No. JP 2008-328578 filed in the Japanese Patent Office on Dec. 24, 2008, the entire content of which is incorporated herein by reference.

BACKGROUND OF THE INVENTION

1. Field of the Invention

The present invention relates to an image pickup apparatus such as a digital camera, etc.

2. Description of the Related Art

There is a shutter device used in an image pickup apparatus such as a digital camera, etc., as described in Japanese Utility Model Publication No. Hei 6-26895 (hereinafter referred to as Patent Document 1). The shutter device described in Patent Document 1 includes both a front curtain and a rear curtain. Explanation is here focused on the operation of the rear curtain.

In such a shutter device, a drive lever for driving a rear curtain (a rear curtain drive member) is pivotably shifted to a given position by a cam member (a charge member) at the time of shooting to charge a drive-purpose spring of the drive lever.

The drive lever is held by an electromagnet at the point of time when the rear curtain is shifted to the exposure start position. Specifically, after the rear curtain has been shifted to the exposure start position along with the pivoting movement of the drive lever, the energization of the electromagnet is started. Incidentally, the electromagnet is disposed at a position opposed to the iron piece of the drive lever when the rear curtain is at the exposure start position. Further, in response to the start of the energization, the iron piece is attracted by the electromagnet so that the biasing force of the charge spring is cancelled by the attractive force of the charge spring. Such attractive action of the electromagnet maintains the drive lever at a given position as well as the rear curtain at the exposure start position. A cam member which has shifted the drive lever to the given position is shifted to an appropriate retreat position so as not to hinder the traveling movement of the rear curtain, which is described later.

Thereafter, the front curtain travels and then the energization of the electromagnet is ceased so that the rear curtain travels. Specifically, in response to such de-energization, force (electromagnetic attractive force) counteracting the biasing force of the charge spring disappears. Therefore, the biasing force allows the drive lever to start to shift. Along with the shifting operation, the rear curtain shifts from the exposure start position toward the exposure end position.

Japanese Patent Laid-Open No. 2003-15190 (hereinafter referred to as Patent Document 2) describes the technology in which a drive lever having shifted a rear curtain to an exposure start position is held using not the magnetic force of an electromagnet but the pressing force of a mechanical holding mechanism. Specifically, the charge member (setting member) for charging a spring force regarding the drive member comes into contact with the drive lever to apply a pressing force thereto. In this way, the drive lever is held. Thereafter, when the rear curtain is driven, operation for releasing the holding of the drive lever (specifically, the turning operation of the charge member) is executed before the driving operation of the rear curtain.

SUMMARY OF THE INVENTION

Incidentally, there have been single-lens reflex digital cameras mounted with live view function in recent years.

Examples of technologies for realizing such a live view function include one in which a sub imager is provided in addition to a main imager and it realizes live view. In addition, there is a technology in which time-series images obtained by a main imager are used as live view images. In particular, the latter technology needs to maintain the exposure opening of a shutter device in an opened state.

If the shutter device described in Patent Document 1 uses the latter live view technology, the following problem occurs. Specifically, if live view is realized using the shutter device as described above, it is necessary to continue the energization of the electromagnet in order to continuously maintain the rear curtain at the exposure start position. As described above, the constant energization is demanded during the live view. This poses a problem with an increase in power consumption.

The increase in power consumption can be avoided by holding the rear curtain drive member by the pressing force resulting from the use of the mechanical holding mechanism as in Patent Document 2. However, the technology of Patent Document 2 needs to set time for releasing the holding of the rear curtain drive member by the mechanical holding mechanism, after the depression of the release button. Therefore, the so-called release time-lag is increased.

It is desirable, therefore, to provide an image pickup apparatus that can reduce power consumption during movie shooting such as live view while avoiding an increase in release time-lag.

According to an embodiment of the present invention, there is provided an image pickup apparatus including: a shutter device; an image pickup element adapted to sequentially acquire time-series images regarding object images passing through an exposure opening of the shutter device; and control means for controlling operation of the shutter device and operation of the image pickup element; wherein the shutter device includes a rear curtain traveling from an exposure start position to an exposure end position and then covering the opening, a rear curtain drive member allowing the rear curtain to travel from the exposure start position to the exposure end position, biasing force application means for applying a biasing force to the rear curtain drive member, the biasing force being adapted to shift the rear curtain in a direction from the exposure start position toward the exposure end position, holding means for holding the rear curtain drive member against the biasing force through an attractive force based on an magnetic force of a permanent magnet, and holding-releasing means for releasing the holding of the rear curtain drive means by allowing energization of an electromagnet to generate a magnetic flux having a direction of cancelling a magnetic flux of the permanent magnet to reduce the attractive force, and wherein the control means allows the image pickup element to acquire the time-series images regarding the object image passing through the opening, in a state where the rear curtain drive member is held at a given position by being attracted by the holding means through the attractive force based on the magnetic force of the permanent magnet and the rear curtain is maintained at the exposure start position, and the control means allows the energization of the electromagnet to start at given timing after issuance of a shooting instruction regarding an actual shooting image to release the holding of the rear curtain drive member and allows the rear curtain through the biasing force to travel from the exposure start position to the exposure end position.

According to another embodiment of the present invention, there is provided an image pickup apparatus including: a shutter device; an image pickup element adapted to sequentially acquire time-series images regarding object images passing through an exposure opening of the shutter device; and control means for controlling operation of the shutter device and operation of the image pickup element; wherein the shutter device includes a rear curtain traveling from an exposure start position to an exposure end position and then covering the opening, a rear curtain drive member allowing the rear curtain to travel from the exposure start position to the exposure end position, biasing force application means for applying a biasing force to the rear curtain drive member, the biasing force being adapted to shift the rear curtain in a direction from the exposure start position toward the exposure end position, attractive force adjusting means, having a permanent magnet and an electromagnet, for holding, against the biasing force, the rear curtain drive member through an attractive force based on a magnetic force of the permanent magnet, and allowing energization of the electromagnet to generate a magnetic flux having a direction of cancelling a magnetic flux of the permanent magnet to reduce the attractive force, thereby releasing the holding of the rear curtain drive member, and wherein the control means allows the image pickup element to acquire the time-series images regarding the object image passing through the opening, in a state where the rear curtain drive member is held at a given position by being attracted by the holding means through the attractive force based on the magnetic force of the permanent magnet so that the rear curtain is maintained at the exposure start position, and the control means allows the energization of the electromagnet to start at given timing after issuance of a shooting instruction regarding an actual shooting image to release the holding of the rear curtain drive member and allows the rear curtain through the biasing force to travel from the exposure start position to the exposure end position.

The present embodiment can reduce power consumption during movie shooting such as live view while avoiding an increase in release time-lag.

BRIEF DESCRIPTION OF THE DRAWINGS

FIG. 16 is a time chart of shooting operation in a live view mode; and

FIG. 17 is a time chart illustrating operation of a comparative example.

DETAILED DESCRIPTION OF THE PREFERRED EMBODIMENTS

Figure 1:
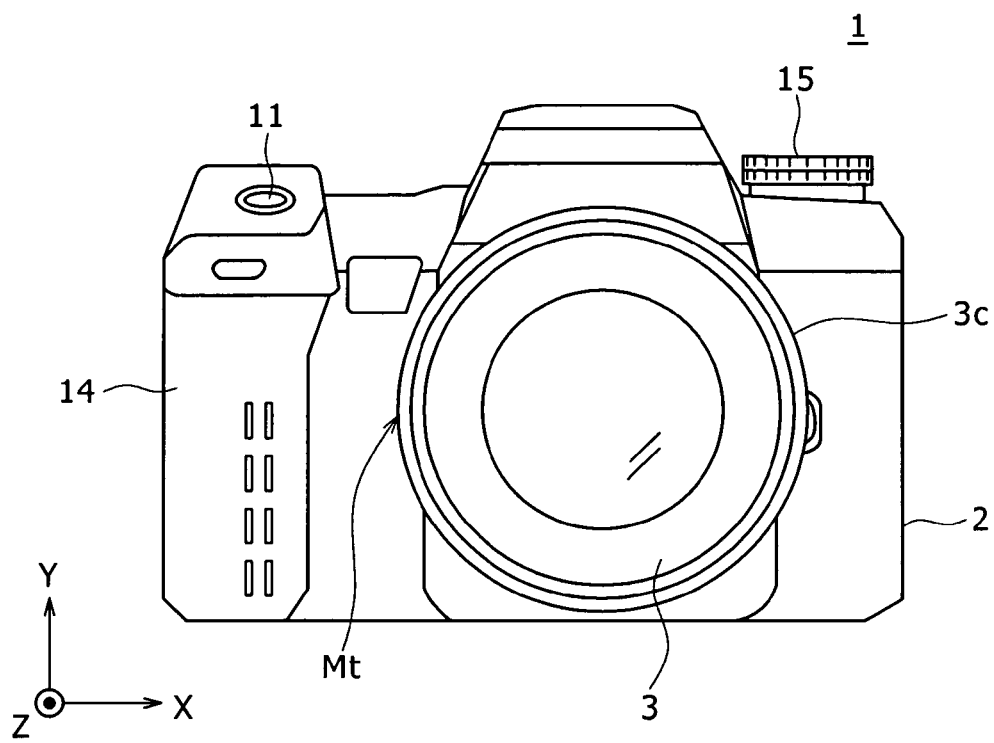
FIG. 1 is a front external view of an image pickup apparatus.

A description will hereinafter be given of preferred embodiments of the present invention. Incidentally, the description is given in the following order:
1. Outline of an image pickup apparatus
2. Functional block of the image pickup apparatus
3. Outline of imaging operation
4. Configuration of a shutter device
5. Operation of the shutter device
6. Others (1. Outline of the Image Pickup Apparatus)

Figure 2:
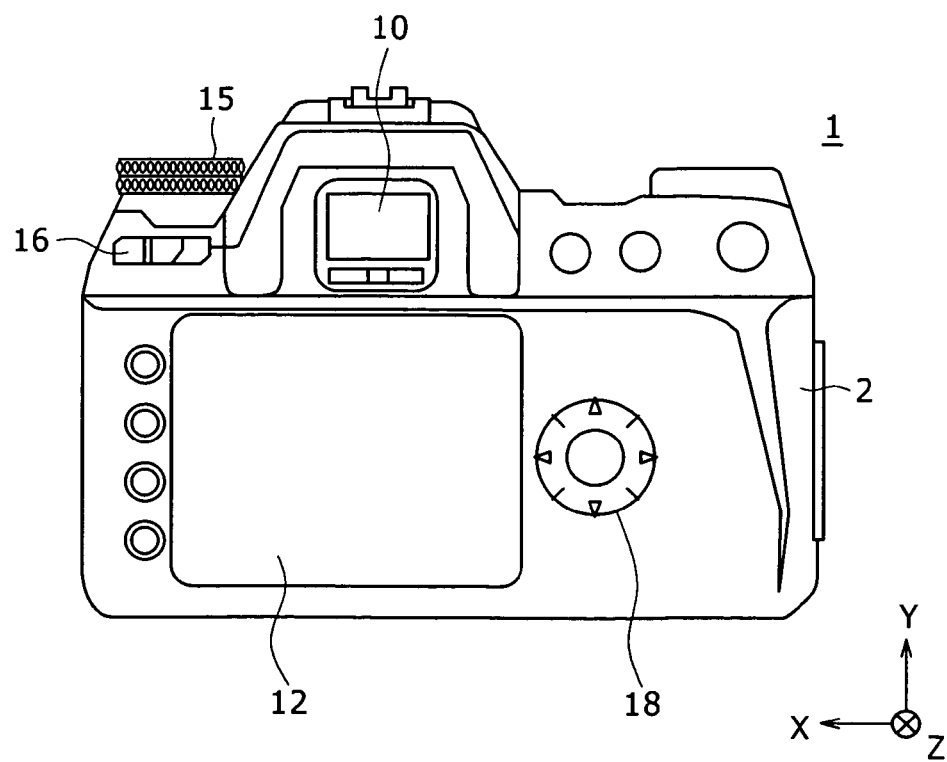
FIG. 2 is a rear external view of the image pickup apparatus.

FIGS. 1 and 2 illustrate external appearances of an image pickup apparatus according to an embodiment of the present invention. Specifically, FIG. 1 is a front external view of the image pickup apparatus 1 and FIG. 2 is a rear external view of the image pickup apparatus 1. The image pickup apparatus 1 is configured as a single-lens reflex camera with interchangeable lenses.

Referring to FIG. 1, the image pickup apparatus 1 includes a camera main body (camera body) 2, to which an interchangeable imaging lens unit (interchangeable lens) 3 is removably mounted.

The imaging lens unit 3 mainly includes a lens barrel 3c, a lens group 3e installed inside the lens barrel 3c, and a diaphragm. See FIG. 3. The lens group 3e (the imaging optical system) includes a focus lens which is shifted in an optical-axial direction to change a focal position.

The camera main body 2 is provided at the general front center with an annular mount portion Mt adapted to receive the imaging lens unit 3 mounted thereto.

The camera main body 2 is provided with a mode setting dial 15 at its front upper-right portion. The operation of the mode setting dial 15 can perform the setting operation (switching operation) for various modes of the camera. The various modes include a shooting mode for picking up an actual shooting image; a reproducing mode for reproducing the image picked up; and a communication mode for data communication with external equipment.

The camera main body 2 is provided at a front left end portion with a grip portion 14 gripped by a user. A release button 11 for instructing exposure start is disposed on the upper surface of the grip portion 14. The grip portion 14 is internally provided with a battery housing chamber and a card housing chamber. The battery housing chamber houses a battery such as e.g. a lithium-ion battery as an electric source of the camera. The card housing chamber is designed to removably house a memory card 90 used to record the image data of images. See FIG. 3.

The release button 11 is a two-stepped detection button capable of detecting two states, a half-press state (S1-state) and a full-press state (S2-state). If the release button 11 is half-pressed and brought into the S1-state, preparing operation (e.g. AF (Autofocus) control operation and the like) for taking a recording still image (actual shooting image) of an object. If the release button 11 is further depressed and brought into the S2-state, the imaging operation for the actual shooting image is performed. Specifically, exposure operation for an object's image (an optical image of the object) is performed using an image pickup element 5, which is described later. A series of operation is performed in which the image signals obtained by the exposure operation are subjected to predefined image processing. In this way, if the release button 11 is brought into the half press state S1, the image pickup apparatus 1 is assumed to receive an imaging preparation instruction. If the release button 11 is brought into the full-press state S2, the image pickup apparatus is assumed to receive an imaging instruction.

Referring to FIG. 2, the camera main body 2 is provided with a viewfinder (ocular window) 10 on the back at the general upper center. By looking into the viewfinder 10 a photographer can visibly recognize the optical image of the object led from the imaging lens unit 3 and determine composition. In short, the photographer can perform framing using the optical view finder.

In FIG. 2, the camera main body 2 is provided with a rear monitor 12 on the back at the general center. The rear monitor 12 is composed as e.g. a color liquid crystal display (LCD).

The rear monitor 12 can display a menu screen for setting shooting conditions and reproduce and display an image recorded in the memory card 90 in the reproduction mode.

The rear monitor 12 also can sequentially display, as live view images, a plurality of time-series images (i.e., moving pictures) obtained by the image pickup element 5, which is described later. The image pickup apparatus 1 of the embodiment can perform framing using the live view images displayed on the rear monitor 12.

A power switch (main switch) 16 is provided at an upper left portion of the rear monitor 12. The power switch 16 is composed of a two-point slide switch. If a contact is set at a left "OFF" position, a power source is turned off. If the contact is set at a right "ON" position, the power source is turned on.

A direction selection key 18 is provided on the right of the rear monitor 12. This direction selection key 18 has a circular operation button. This operation button is designed to detect the pressing operation of four directions, up, down, left and right, and of other four directions, upper right, upper left, lower right and lower left. In addition, the direction selection key 18 can detect also the pressing operation of a central push button as well as that of the eight directions mentioned above.

(2. Functional Block of the Image Pickup Apparatus)

Figure 3:
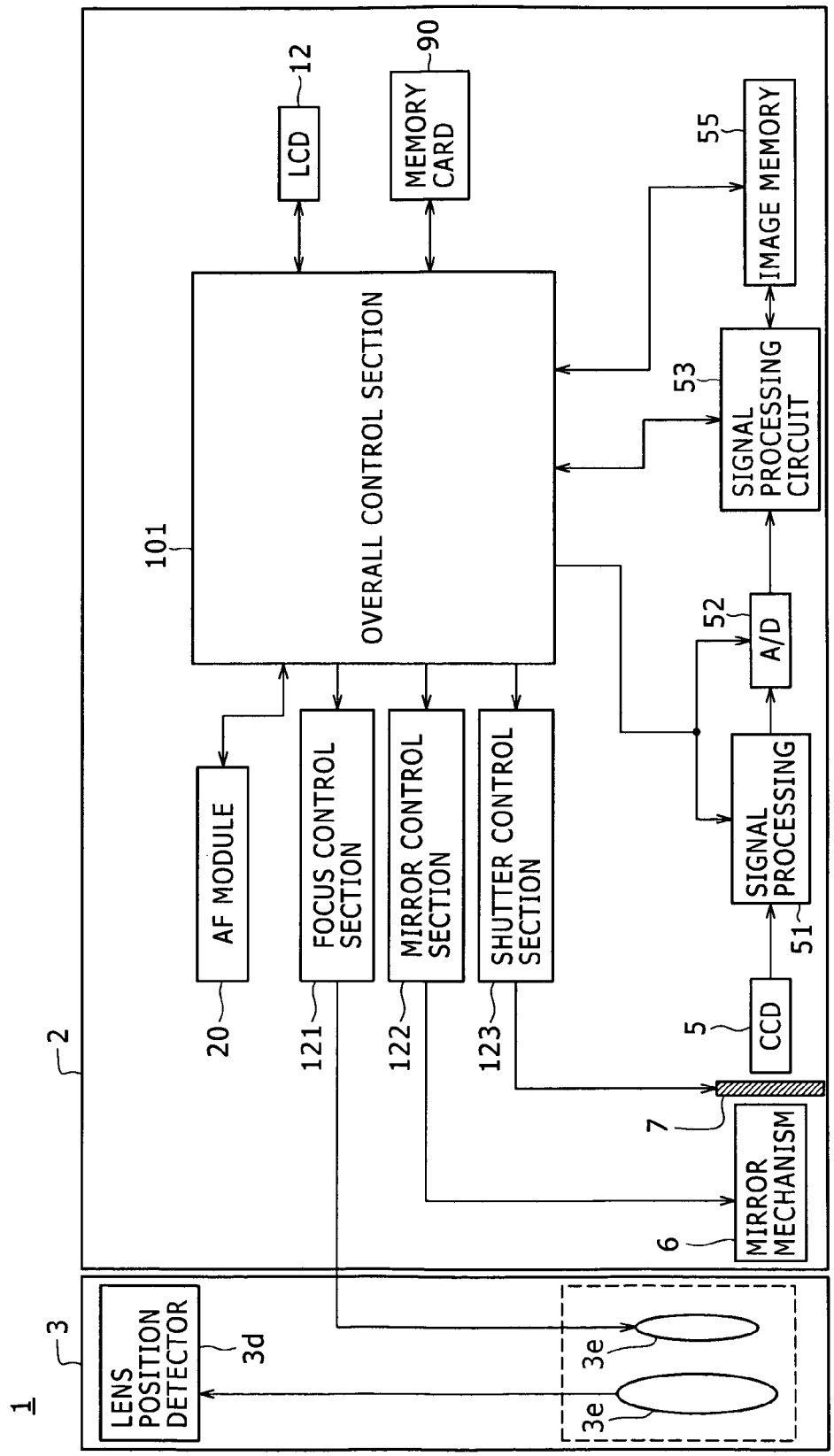
FIG. 3 is a block diagram illustrating a functional configuration of the image pickup apparatus.

The outline of the function of the image pickup apparatus 1 is described with reference to FIG. 3. FIG. 3 is a block diagram illustrating the functional configuration of the image pickup apparatus 1.

Referring to FIG. 3, the image pickup apparatus 1 includes an AF module 20, an overall control section 101, a focus control section 121, a mirror control section 122, a shutter control section 123, and a digital signal processing circuit 53.

The overall control section 101 is configured as a microcomputer and mainly includes a CPU (Central Processing Unit), a memory, and a ROM (Read Only Memory) (e.g. EEPROM (Electrically Erasable and Programmable ROM)). The overall control section 101 reads out a program stored in the ROM and the program is executed by the CPU to realize various functions. The overall control section 101 integrally controls AF operation, the operation of the shutter device, the operation of the image pickup element, etc.

The AF module 20 can detect a focusing state of an object by means of a focusing detection technique of a phase difference method by using light entering through a mirror mechanism 6. By using the focus control section 121, the overall control section 101 realizes AF operation according to the focusing state of the object detected by the AF module 20. A focusing lens position can be determined very fast especially by using the AF module 20 of the phase difference method.

The focus control section 121 realizes focusing control operation in cooperation with the overall control section 101. Specifically, the focus control section 121 creates a control signal based on a signal inputted from the overall control section 101 and shifts the focus lens included in the lens group 3e of the imaging lens unit 3. A lens position detecting section 3d of the imaging lens unit 3 detects the position of the focus lens and sends data indicative of the focus lens position to the overall control section 101. In this way, the focus control section 121 controls the optical-axial movement of the focus lens and the like.

The mirror control section 122 controls state-switching between a state where the mirror mechanism 6 is retreated from an optical path (a mirror-up state) and a state where the mirror mechanism 6 intercepts the optical path (a mirror-down state). The mirror control section 122 switches between the mirror-up state and the mirror-down state by creating the control signal based on the signal inputted from the overall control section 101.

The shutter control section 123 controls the operation (especially, drive operation) of the shutter device 7 by creating a control signal based on a signal inputted from the overall control section 101.

The shutter device 7 is disposed on the object side of the image pickup element 5 and close to the image pickup element 5. The shutter device 7 is the so-called focal plane shutter. The shutter device 7 is arranged generally vertically to the optical axis of the imaging lens unit 3. More specifically, the shutter device 7 is arranged such that the central position of an opening OP of the shutter device 7 is aligned with the optical axis of the imaging lens unit 3. The opening will be described later.

The image pickup element 5 is disposed on the rear side of the shutter device 7 generally vertically to the optical axis of the imaging lens unit 3.

The image pickup element (here a CMOS (Complementary Metal Oxide Semiconductor) sensor) 5 is a light-receiving element that converts the optical image of the object (the object's image) from the imaging lens unit 3 into an electric signal through photoelectric conversion. The image pickup element 5 creates and obtains an image signal (an image signal for recording) with respect to the actual shooting image. In addition, the image pickup element 5 obtains also an image for live view.

The image pickup element 5 performs exposure (charge accumulation through photoelectric conversion) of the object's image focused on a light-receiving surface in response to drive control signals (an accumulation start signal and an accumulation completion signal) from the overall control section 101. Thus, the image pickup element 5 creates an image signal regarding the object's image. In addition, the image pickup element 5 sends the image signal to a signal processing section 51 in response to a read-out control signal from the overall control section 101.

The signal processing section 51 performs predefined analog signal processing on the image signal obtained by the image pickup element 5. Then, an A/D (Analog to Digital) conversion circuit 52 converts the image signal having subjected to the analog signal processing into digital image data (image data). This digital image data is inputted to a digital signal processing circuit 53.

The digital signal processing circuit 53 performs digital signal processing on the image data inputted from the A/D conversion circuit 52 to create image data with respect to the image. The digital signal processing circuit 53 includes a black level correction circuit, a white balance (WB) circuit, and a γ-correction circuit and performs various digital image processing. Incidentally, the image signal (image data) processed by the digital signal processing circuit 53 is stored into the image memory 55. The image memory 55 is a fast accessible image memory adapted to temporarily store the created image data. In addition, the image memory has capacity capable of storing image data corresponding to a plurality of frames.

At the time of actual shooting, the image data temporarily stored in the image memory 55 is subjected to appropriate image processing (compression, etc.) by the overall control section 101 and thereafter stored in the memory card 90.

At the time of live view, time-series images (live view images) obtained by the image pickup element 5 and temporarily stored in the image memory 55 are sequentially displayed on the rear monitor 12.

(3. Outline of Imaging Operation)

As described above, this image pickup apparatus 1 can plan composition (framing) using an optical finder composed of a finder optical system, etc. The optical finder is also called an optical viewfinder (OVF).

The image pickup apparatus 1 also can perform framing using the live view image displayed on the rear monitor 12. The finder function realized by using the rear monitor 12 is also called an electronic viewfinder (EVF) because the optical image of an object is converted into electronic data, which is then visualized.

An OVF-used framing mode (OVF mode) and an EVF-used framing mode (EVF mode) are switched therebetween by an appropriate change-over switch, which is not illustrated.

Figure 4:
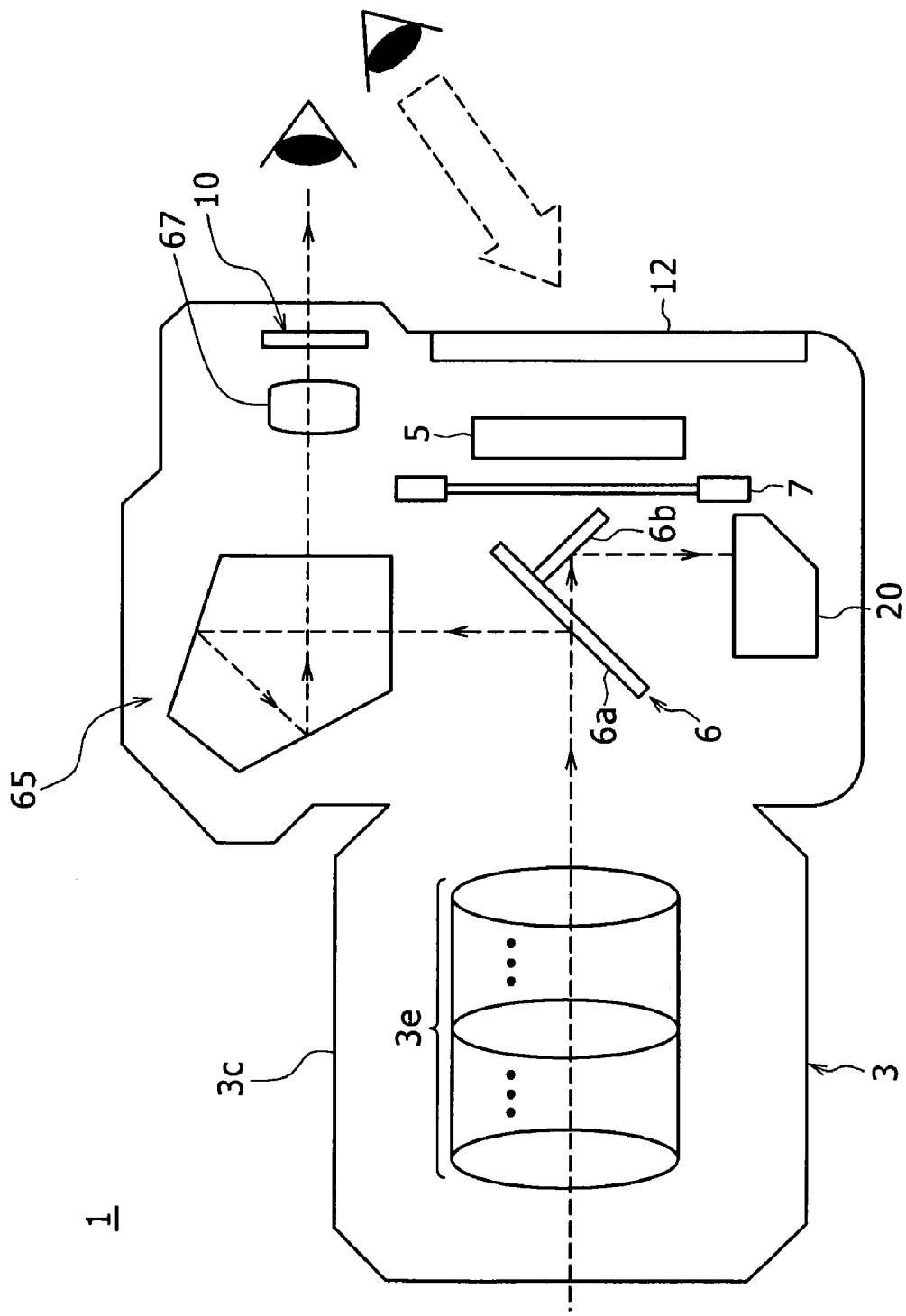
FIG. 4 is a cross-sectional view of the image pickup apparatus in a mirror-down state.
Figure 5:
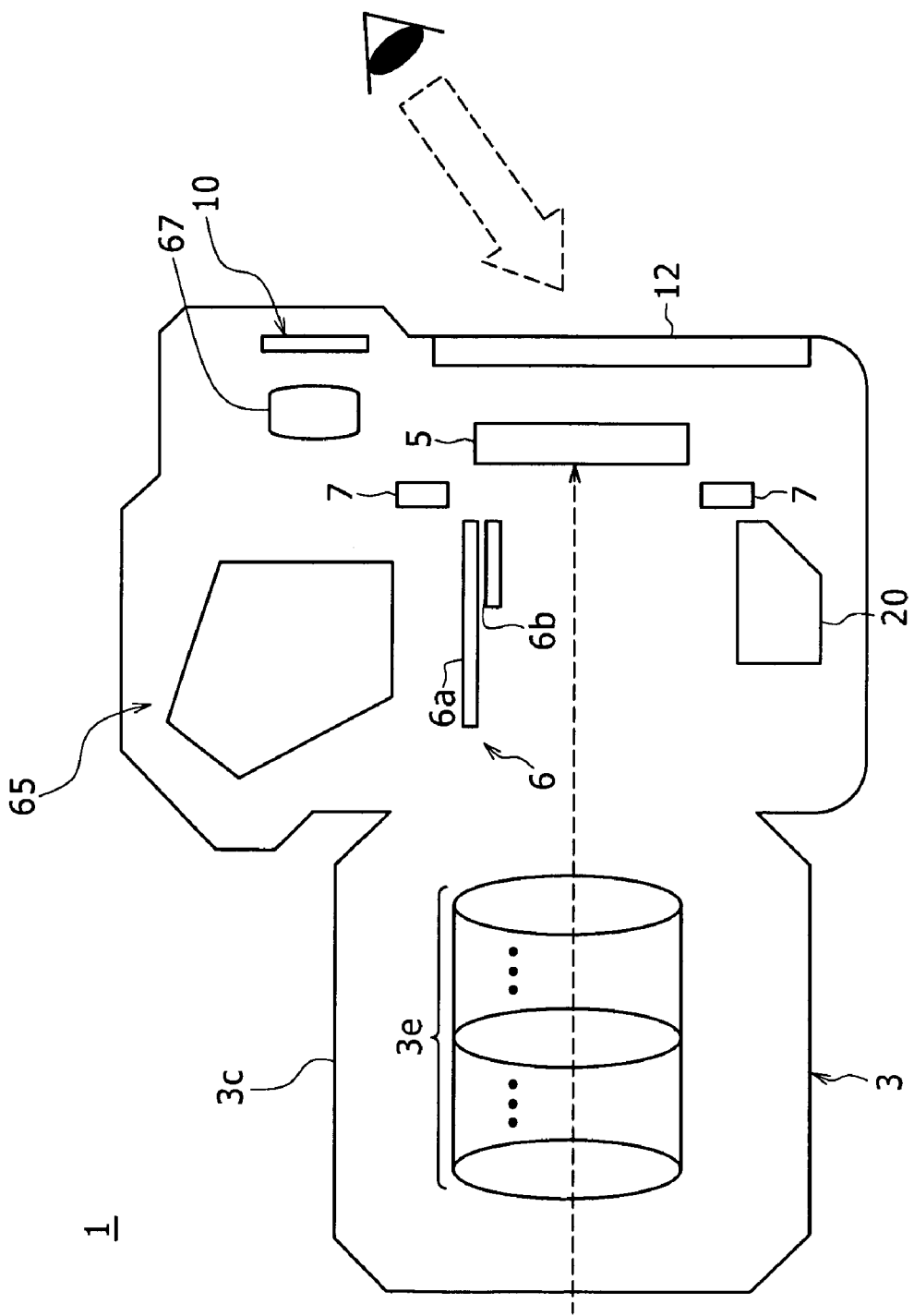
FIG. 5 is a cross-sectional view of the image pickup apparatus in a mirror-up state.

FIGS. 4 and 5 are cross-sectional views of the image pickup apparatus 1. FIG. 4 illustrates the mirror-down state and FIG. 5 illustrates the mirror-up state.

Referring to FIGS. 4 and 5, the mirror mechanism 6 is provided on an optical path (shooting optical path) extending from the imaging lens unit 3 to the image pickup element 5. The mirror mechanism 6 has a main mirror 6a (a main reflecting surface) adapted to reflect light from the imaging optical system toward the upside. This main mirror 6a is partially or fully configured as a half-mirror, which transmits part of light from the imaging optical system. In addition, the main mirror 6a has a sub mirror (sub reflecting surface) 6b adapted to reflect light passing through the main mirror 6a toward the downside. The light reflected downward by the sub mirror 6b is led and enters the AF module 20 and is used for the AF operation of a phase difference method.

In the OVF mode, the mirror mechanism 6 is arranged in the mirror-down state (FIG. 4) until the release button 11 will be brought into the full-press state S2 (i.e., at the time of framing). In this case, the object's image from the imaging lens unit 3 is reflected upward by the main mirror 6a and as an observation light flux enters a pentaprism 65. The object's image is further reflected by the pentaprism 65, passing through an eye lens 67 and a viewfinder 10, and reaches the photographer's eye. In this way, framing operation is performed using the optical viewfinder (OVF).

Thereafter, when the release button 11 is brought into the full-press state S2, the mirror mechanism 6 is activated to come into the mirror-up state to start exposure operation. See FIG. 5. Specifically, as illustrated in FIG. 5, the mirror mechanism 6 is retreated from the photographing optical path during exposure. For details, the main mirror 6a and sub mirror 6b are retreated upward so as not to intercept light (the object's image) from the imaging optical system. Light from the imaging lens unit 3 proceeds without being reflected by the main mirror 6a and reaches the image pickup element 5 according to the opened period of the shutter device 7. The image pickup element 5 creates the picture signal of the object through photoelectric conversion based on the received light flux. In this way, the light flux (the object's image) from the object passes through the imaging lens unit 3 and is led to the image pickup element 5. Thus, the image (image data) with respect to the object can be obtained.

On the other hand, the following operation is performed in the EVF mode, which is also called the live view mode.

Specifically, the mirror mechanism 6 is arranged in the mirror-up state (FIG. 5) until the release button 11 will be brought into the full-press state S2 (that is, at the time of framing). In this case, the object's image from the imaging lens unit 3 goes straight ahead as it is, i.e., without reflected by the main mirror 6a and enters the image pickup element 5. In addition, during the live view period, the opening OP of the shutter device 7 is maintained in an opened state and therefore the object's image passes through the opening OP and reaches the image pickup element 5.

The image pickup element 5 sequentially obtains time-series images (live view images) with respect to the object's image based on the object's image having entered the image pickup element 5. Specifically, the image pickup element 5 sequentially creates a plurality of images at minute time intervals (e.g. 1/60 second). Then, the time-series images thus obtained are sequentially displayed. In this way, the photographer visually recognizes moving images (live view images) and can perform framing using the moving images. Thus, the framing operation can be executed using the live view images.

Thereafter, if the release button 11 is brought into the full-press state S2, an electric front curtain and a mechanical rear curtain travel to execute exposure operation. The electric front curtain and the mechanical rear curtain are described later. The image pickup element 5 creates the image signal of the object through photoelectric conversion based on the object's image reaching the image pickup element during the open period of the shutter device 7. In this way, the light flux from the object (the object's image) passes through the imaging lens unit 3 and is led to the image pickup element 5. Thus, the actual shooting images (image data) regarding the object can be obtained. Further, thereafter, live view display is started again.

(4. Configuration of the Shutter Device)

Figure 6:
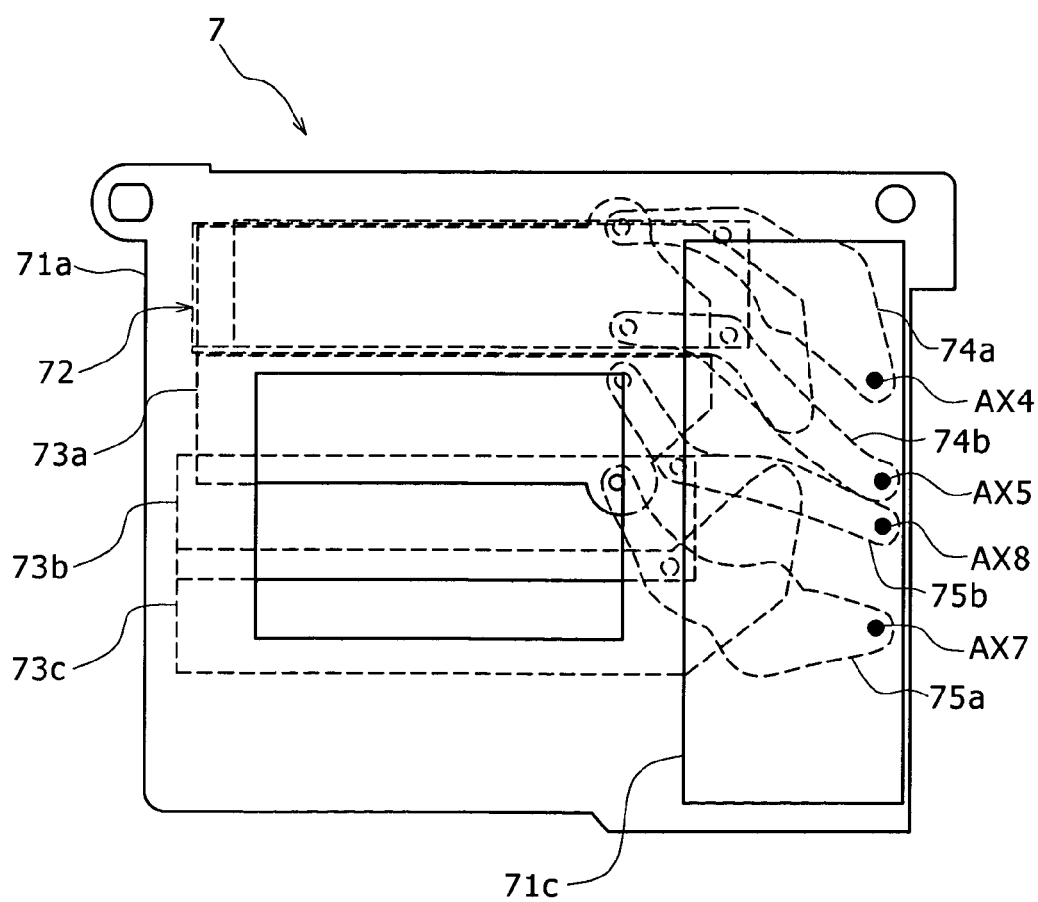
FIG. 6 is a front view illustrating a configuration of a shutter device.
Figure 7:
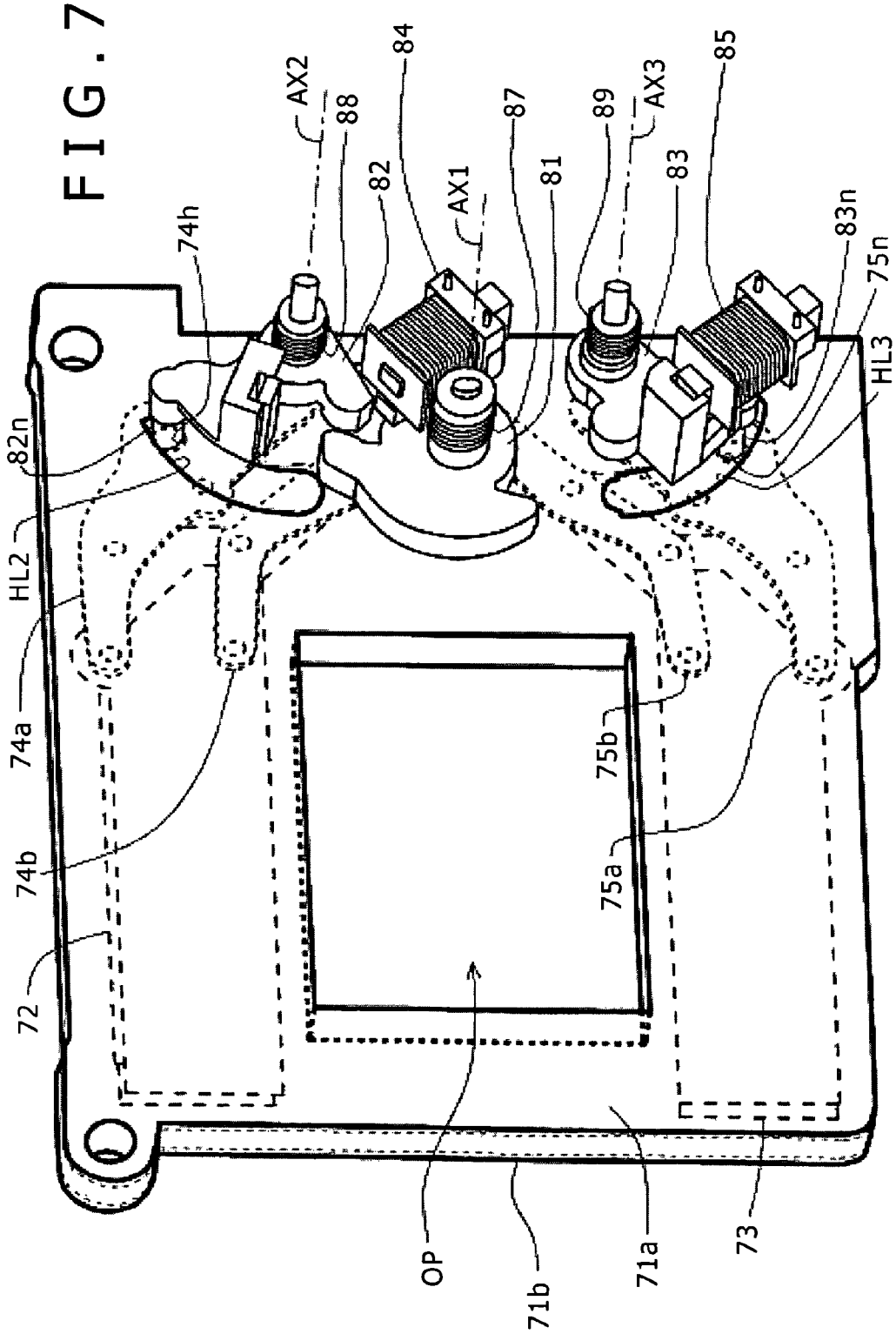
FIG. 7 is a perspective view of a configuration of the shutter device.

FIG. 6 is a front view illustrating a configuration of the shutter device 7. FIG. 7 is a perspective view illustrating the configuration of the shutter device 7. Incidentally, in FIG. 7 other component parts (a plate-like member 71c, etc.) are omitted to illustrate an internal configuration of a drive mechanism 80, which is described later.

The image pickup apparatus 1 uses the so-called "electronic front curtain" as a front curtain of the shutter device 7 in the EVF mode. For example, operation in which the image pickup element 5 sequentially executes resetting operation for each predefined unit (e.g. each line) in a predefined direction corresponds to the "traveling operation" of the electronic front curtain. The mechanical rear curtain travels so as to follow the leading end position of the "traveling electronic front curtain." This realizes exposure operation in the minute time period. In this case, if attention is paid to a certain pixel in the image pickup element (e.g. CMOS) 5, the exposure operation regarding this pixel is performed during the time period TM (=T2−T1) from time T1 immediately after the resetting operation of the image pickup element 5 to time T2 when the "rear curtain" shields the pixel to interrupt light. The length of the time period TM (e.g. 1/100 second) corresponds to shutter speed.

However, the shutter device 7 is also provided with a mechanical front curtain. In short, the shutter device 7 is provided with both the mechanical front curtain and the mechanical rear curtain. This mechanical front curtain 72 operates as a common front curtain (the mechanical front curtain) in the OVF mode. The mechanical front curtain 72 is described later. On the other hand, in the EVF mode, the front curtain 72 executes multiple exposure preventive operation as described later unlike the operation of the common front curtain (the mechanical front curtain) in the OVF mode.

As illustrated in FIGS. 6 and 7, the shutter device includes a shutter base plate 71a, a front blade group 72 (72a, 72b, 72c), a rear blade group 73 (73a, 73b, 73c), and arms 74a, 74b, 75a, 75b. The shutter device 7 is also provided on the rear side of the shutter base plate 71a with an auxiliary base plate 71b having almost the same shape as that of the shutter base plate 71a. Both the base plates 71a, 71b are disposed opposite to each other with a given gap defined therebetween. The gap between both the base plates 71a, 71b is a space adapted to house the rear blade group 73a, 73b, 73c therein; therefore, it is also called "the blade chamber."

The shutter base plate 71a is formed with an opening OP for exposure at the general center. Similarly, the auxiliary base plate 71b is also formed with an opening OP for exposure at the general center. The opening OP of the shutter base plate 71a and the opening OP of the auxiliary base plate 71b have almost the same shape (generally rectangular shape) and are disposed at respective positions corresponding to each other. In the assembled state of the shutter device 7, these openings are united to form the opening OP for exposure in the shutter device 7.

The shutter base plates 71a, 71b are provided with two arcuate elongate holes HL2, HL3, respectively. See FIG. 7. The elongate hole HL2 is provided along an arc around an axis AX2. The elongate hole HL3 is provided along an arc around an axis AX3.

The rear blade group 73a, 73b, 73c is disposed between the shutter base plate 71a and the auxiliary base plate 71b. Each of the rear blades 73a, 73b, 73c is a thin plate-like member with light blocking effect. The rear blades 73a, 73b, 73c constitute "the rear curtain." This embodiment exemplifies the "rear curtain" composed of the group of three rear blades 73a, 73b, 73c. However, the present invention is not limited to the embodiment. The rear curtain may be composed of two or less, or four or more blades.

Each of the rear blades 73a, 73b, 73c is pivotably connected to the arm 75a and also pivotably connected to the arm 75b. The rear blade group 73a, 73b, 73c is also called the rear curtain 73. The arm 75a can be pivoted around an axis AX7 and the arm 75b can be pivoted around an axis AX8. See FIG. 6. Incidentally, the axis AX7 is the same as the axis AX3, which is described later.

As illustrated in FIG. 6, when the arm 75a and the arm 75b are located at predetermined respective positions, the rear curtain composed of the rear blade group 73a, 73b, 73c closes the opening OP. That is to say, "the closed state of the opening OP" by the rear curtain is realized. On the other hand, if the arm 75a is pivoted counterclockwise around the axis AX7 from that state, also the arm 75b is pivoted counterclockwise around the axis AX8. Thus, as illustrated in FIG. 7, the rear curtain composed of the rear blade group 73a, 73b, 73c is retreated from the opening OP. That is to say, "the opened state of the opening OP" by the front curtain is realized. Reversely, if the arm 75a is pivoted clockwise around the axis AX7 and also the arm 75b is pivoted clockwise around the axis AX8, the state shown in FIG. 7 is shifted to "the closed state of the opening OP" of FIG. 6.

Incidentally, the position of the rear blade group 73a, 73b, 73c in FIG. 6 is also referred to as "the exposure end position." In addition, the position of the rear blade group 73a, 73b, 73c in FIG. 7 is also referred to as "the exposure start position." After "the rear curtain" has traveled from the exposure start position to the exposure end position, it covers the opening OP (FIG. 6). After "the rear curtain" has traveled from the exposure end position to the exposure start position, it opens the opening OP (FIG. 7). In other words, the opening OP is not covered by the rear curtain when the rear curtain is at the exposure start position. In addition, the opening OP is covered by the rear curtain when the rear curtain is at the exposure end position.

The front blade group 72a, 72b, 72c is also disposed between the shutter base plate 71a and the auxiliary base plate 71b. Each of the rear blades 72a, 72b, 72c is a thin plate-like member with light blocking effect. The front blades 72a, 72b, 72c constitute the mechanical front curtain 72. Incidentally, the present embodiment exemplifies "the mechanical front curtain" composed of three front blades 72a, 72b, 72c. However, the present invention is not limited to this embodiment. The mechanical front curtain may be composed of two or less, or four or more blades.

Each of the front blades 72a, 72b, 72c is pivotably connected to the arm 74a and also pivotably connected to the arm 74b. The arm 74a can be pivoted around an axis AX4 and the arm 74b can be pivoted around an axis AX5. Incidentally, the axis AX4 is the same as the axis AX2, which is described later.

Figure 12:
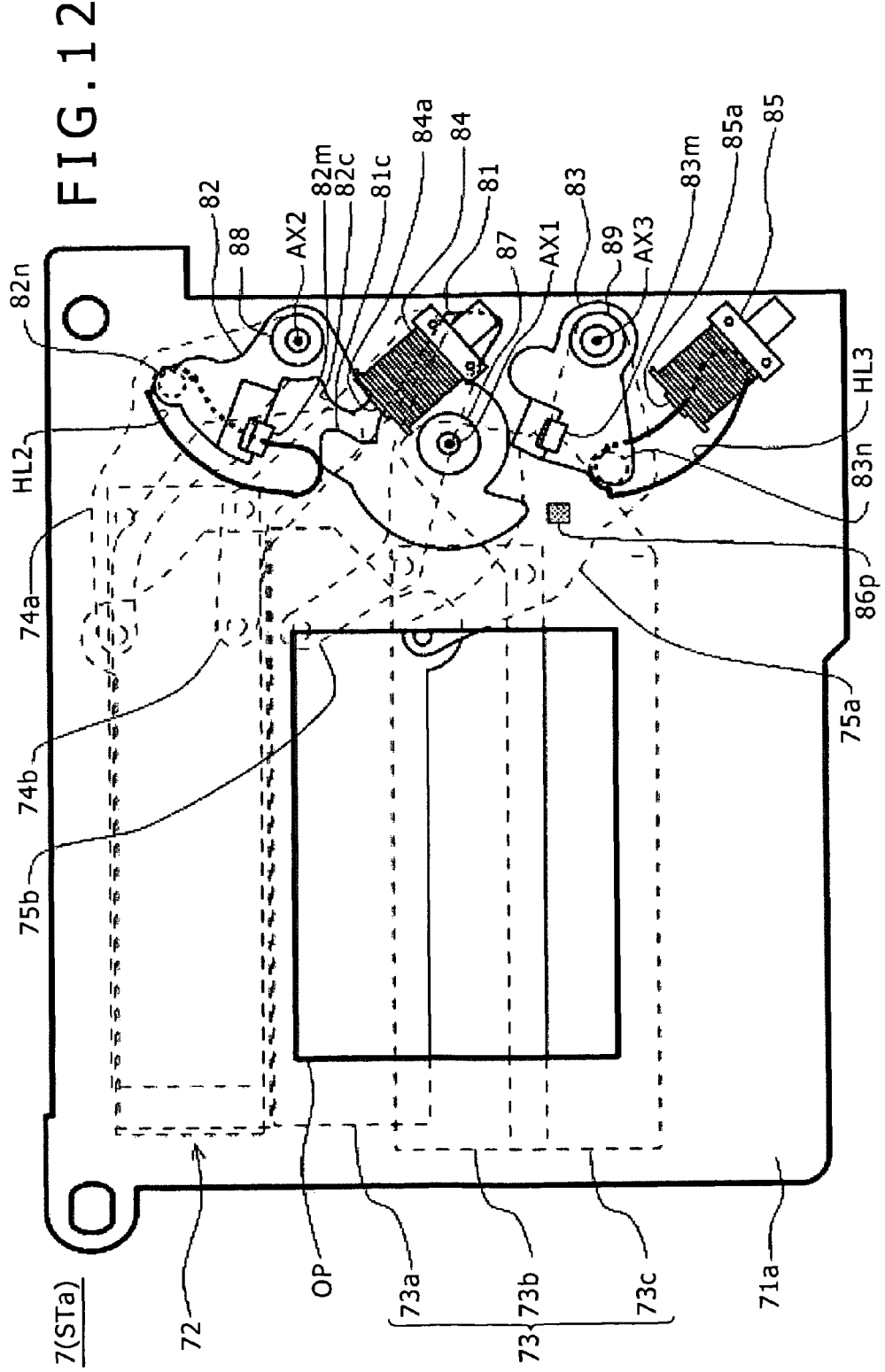
FIG. 12 illustrates a state of the shutter device encountered immediately after the completion of exposure operation.
Figure 13:
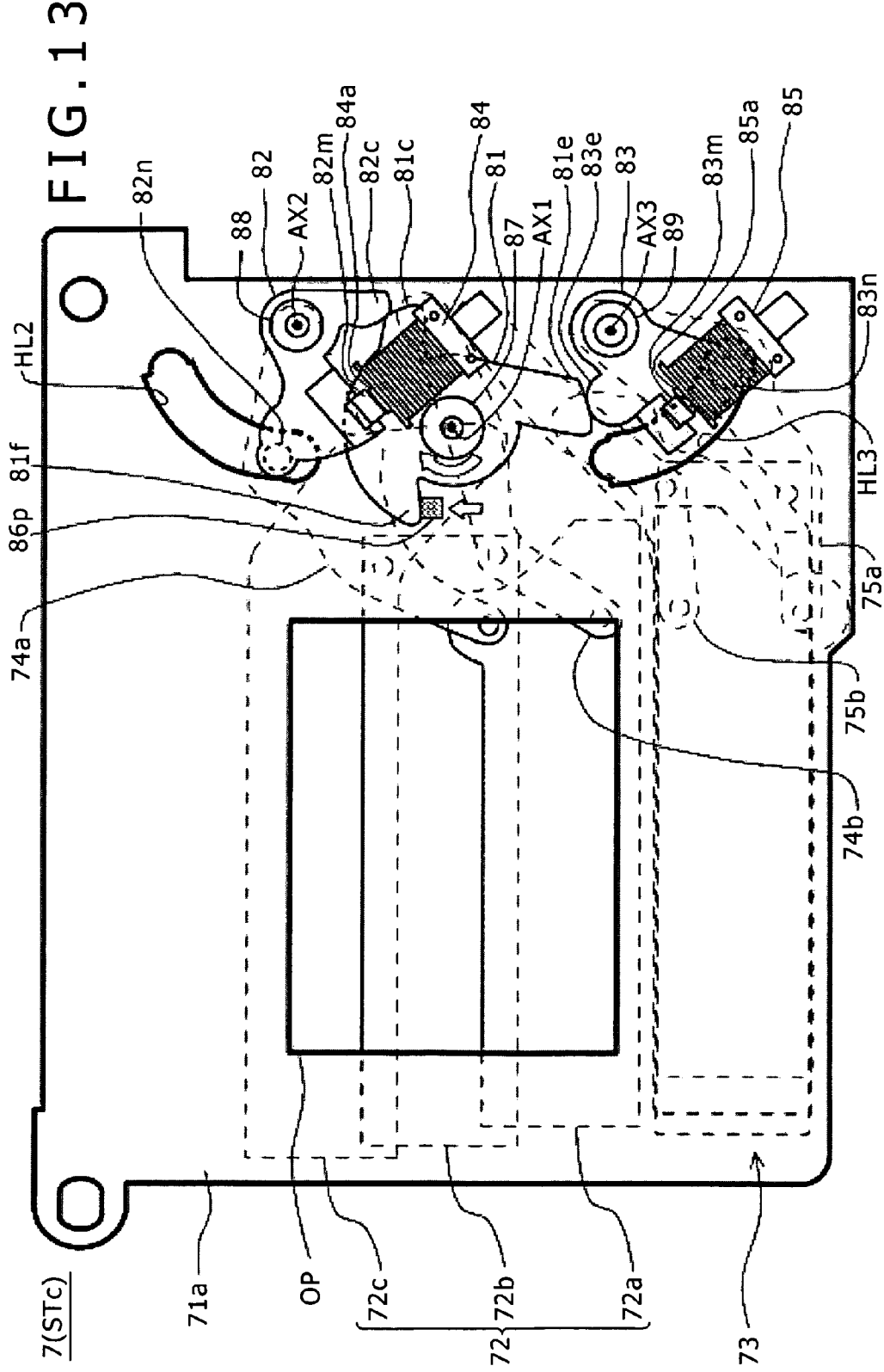
FIG. 13 illustrates a state of the shutter device encountered immediately after the completion of spring charge.
Figure 14:
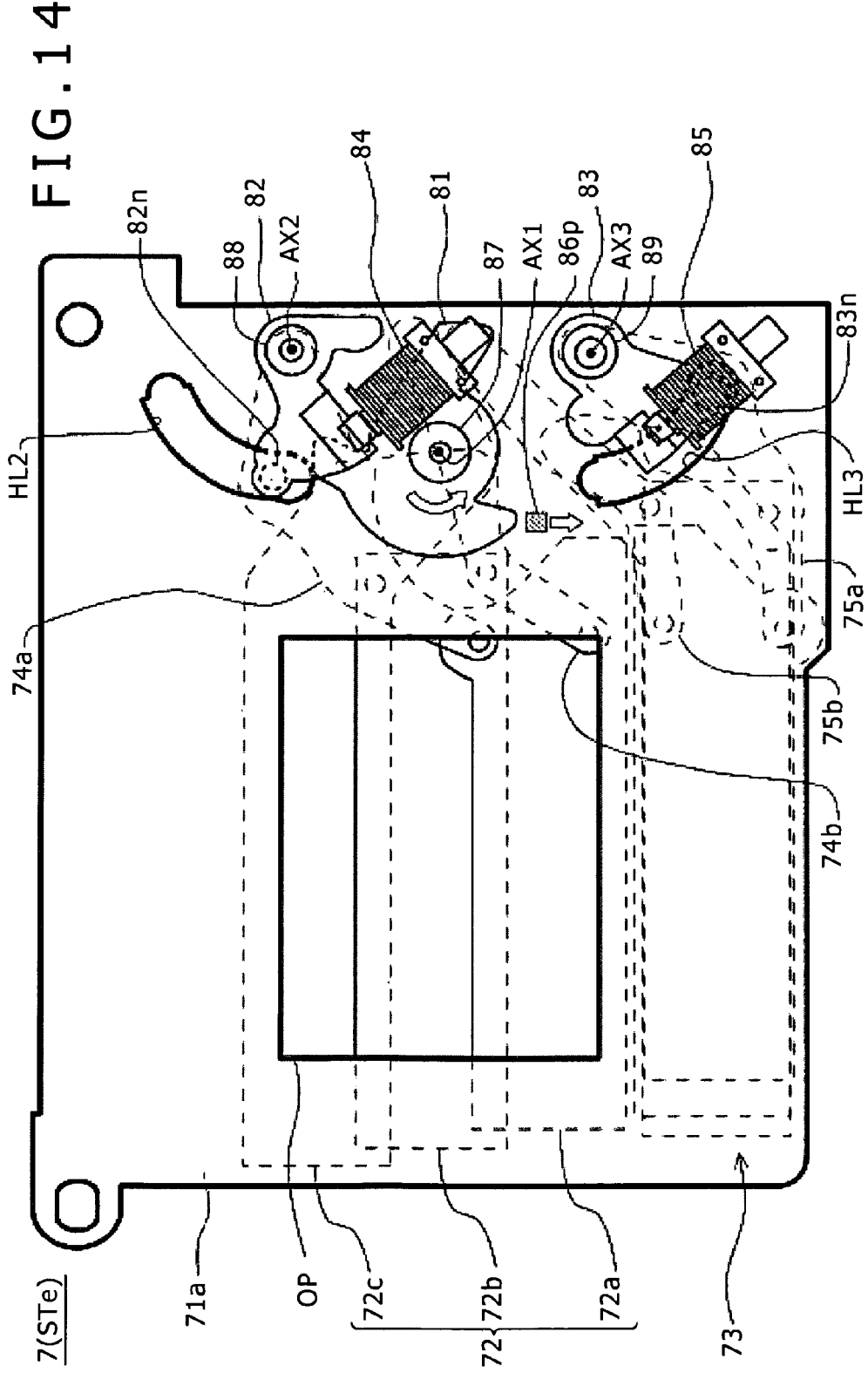
FIG. 14 illustrates a state of the shutter device encountered when the charge member is returned.

As illustrated in FIGS. 13 and 14, if the arms 74a and 74b are at the respective predetermined positions, the front curtain composed of the front blade group 72a, 72b, 72c closes the opening OP. Thus, "the closed state of the opening OP" by the front curtain is realized. On the other hand, if the arm 74a is pivoted clockwise around the axis AX4 (AX2) from that state, also the arm 74b is pivoted clockwise around the axis AX5. Thus, as illustrated in FIGS. 6, 7, 12 and 15, the front curtain 72 composed of the front blade group 72a, 72b, 72c is retreated from the opening OP. That is to say, "the opened state of the opening OP" by the front curtain is realized. In contrast, if the arm 74a is pivoted counterclockwise around the axis AX4 from the state illustrated in FIG. 6, also the arm 74b is pivoted counterclockwise around the axis AX5. Thus, the state illustrated in FIG. 6 is shifted to "the closed state of the opening OP" illustrated in FIG. 13.

The arms 74a, 74b, 75a, 75b, the front curtain 72 and the rear curtain 73 are driven by a drive mechanism 80 described later. FIGS. 8 to 11 illustrate partial component parts 82, 81, 83, 85 (84) of the drive mechanism 80. FIGS. 12 to 15 illustrate a series of operations of the drive mechanism 80.

Figure 9:
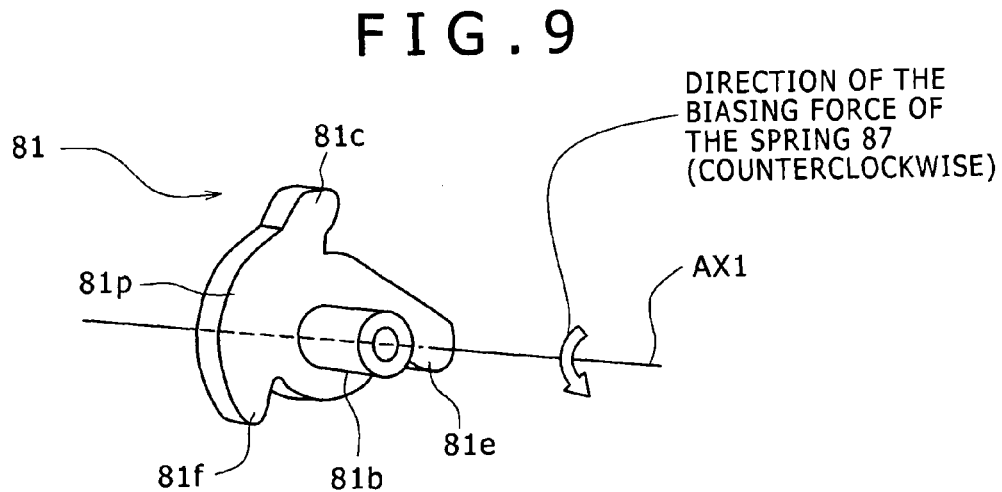
FIG. 9 is a perspective view of a charge member as another component part.
Figure 10:
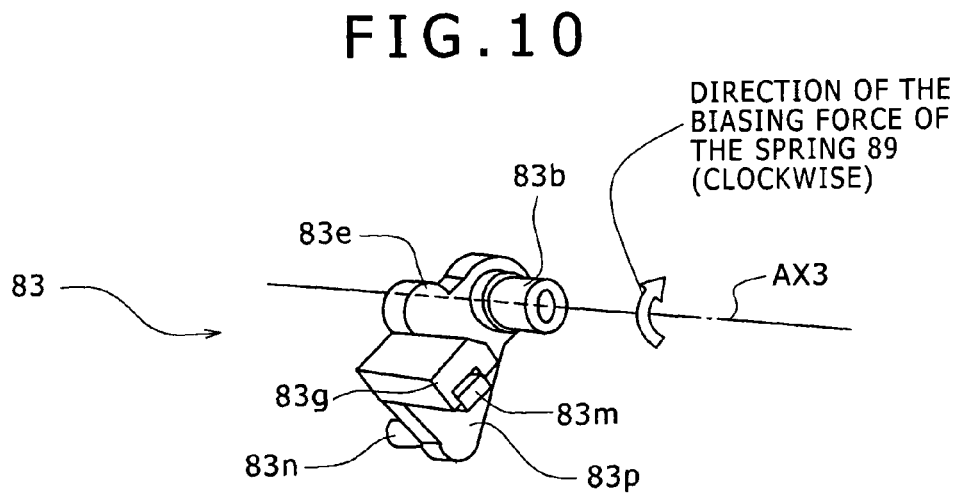
FIG. 10 is a perspective view of a rear curtain drive member as another component part.

As illustrated in FIG. 7 and so on, the drive mechanism 80 includes a charge member 81 (FIG. 9), a front curtain drive member 82 (FIG. 8) and a rear curtain drive member 83 (FIG. 10).

These members 81, 82, 83 are disposed on the front of the shutter base plate 71a (on the front side with respect to the sheet surface of FIGS. 6 and 12, etc.) The rear curtain drive member 83 is a member for allowing the rear curtain 73 to travel from the exposure start position to the exposure end position. The charge member 81 is a member for pivoting the rear curtain drive member 83 around the axis AX3 to increase (charge) the biasing force of a spring 89, which is described later.

The charge member 81 is a generally plate-like turning body capable of turning around the axis AX1. The front curtain drive member 82 is a generally plate-like (generally sectoral) turning member capable of turning around the axis AX2. The rear curtain drive member 83 is a generally plate-like (generally sectoral) turning member capable of turning around the axis AX3.

The charge member 81 and the plate-like member 71c (FIG. 6) are connected to each other by means of a spring 87 (FIG. 7). The spring 87 is adapted to apply a "counterclockwise" biasing force to the charge member 81. The plate-like member 71c is a member that is secured to the shutter base member 71a generally parallel thereto via an upright member for fixation (not shown) on the front side (the front) of the shutter base member 71a. In the present embodiment, the spring 87 uses a torsion sprig disposed on the outer circumference of a cylindrical upright member 81b of the charge member 81. See FIG. 9.

The front curtain drive member 82 and the plate-like member 71c are connected to each other by means of a spring 88. See FIG. 7. The spring 88 is adapted to apply a "clockwise" biasing force to the front curtain drive member 82. In the present embodiment, the spring 88 uses a torsion spring disposed on the outer circumference of the cylindrical upright member 82b of the front drive member 82. See FIG. 8. The clockwise biasing force of the spring 88 acts as force adapted to shift the front curtain 72 from the position of FIG. 14 where the front curtain 72 covers the opening OP to the position of FIG. 15 where the front curtain 72 retreats from the opening OP.

Likewise, the rear, curtain drive member 83 and the plate-like member 71c are connected to each other by means of a spring 89. See FIG. 7. The spring 89 is adapted to apply a "clockwise" biasing force to the rear curtain drive member 83. In the present embodiment, the spring 89 uses a torsion spring disposed on the outer circumference of a cylindrical upright portion 83b of the rear curtain drive member 83. See FIG. 10. The clockwise biasing force of the spring 89 acts as force adapted to shift the rear curtain 73 from the position of FIG. 15 where the rear curtain 73 retreats from the opening OP to the position of FIG. 12 where the rear curtain 73 covers the opening OP.

As illustrated in FIG. 10, the rear curtain drive member 83 includes a plate portion 83p, a link pin 83n, a protruding portion 83e and an upright portion 83g as well as the cylindrical upright portion 83b.

The generally sectoral rear curtain drive member 83 has the link pin 83n on the outer circumferential portion side. The link pin 83n is provided on the rear surface of the plate portion 83p of the rear curtain drive member 83 so as to project upright toward the back side. In addition, the link pin 83n is provided to pass through the elongate hole HL3 of the shutter base plate 71a and through a hole 75h of the arm 75a. See FIG. 7. The hole 75h and the link pin 83n have almost the same diameter. In this way, if the link pin 83n is shifted along with the pivotal movement of the rear curtain drive member 83 around the axis AX3, the arm 75a is pivoted by the link pin 83n around the axis AX7 (=AX3). Thus, the shifting operation of the rear blade group 73a, 73b, 73c, i.e., the opening and closing operation of "the rear curtain" is realized. As described above, "the rear curtain" is operated in conjunction with the link pin 83n, which realizes the closed state of FIG. 6 (also FIG. 12 and so on) and the opened state of FIG. 7 (also FIG. 14 and so on).

The rear curtain drive member 83 has a protruding portion (a contact surface) 83e protruding toward the charge member 81. If the charge member 81 pivots clockwise, the protruding portion 83e comes into contact with the protruding portion 81e of the charge member 81 to undergo the pressing force of the protruding portion 81e. The pressing force pivots the rear curtain drive member 83 counterclockwise. The action of the pressing force permits the rear curtain drive member 83 to pivot counterclockwise against the (clockwise) biasing force of the spring 89.

The plate portion 83p has an upright portion 83g close to the outer circumferential portion of the generally sectoral rear curtain drive member 83. The upright portion 83g is provided to extend upright (on the front side relative to the sheet surface of FIG. 12) from the front surface of the plate portion 83p. An iron piece member 83m is secured to the upright portion 83g.

An attracting member 85 is disposed at the same position (i.e. at the same height) as the iron piece member 83m in the direction vertical to the sheet surface of FIG. 12. The attracting member 85 will be described later. The attracting member 85 is secured to the plate-like member 71c.

Figure 15:
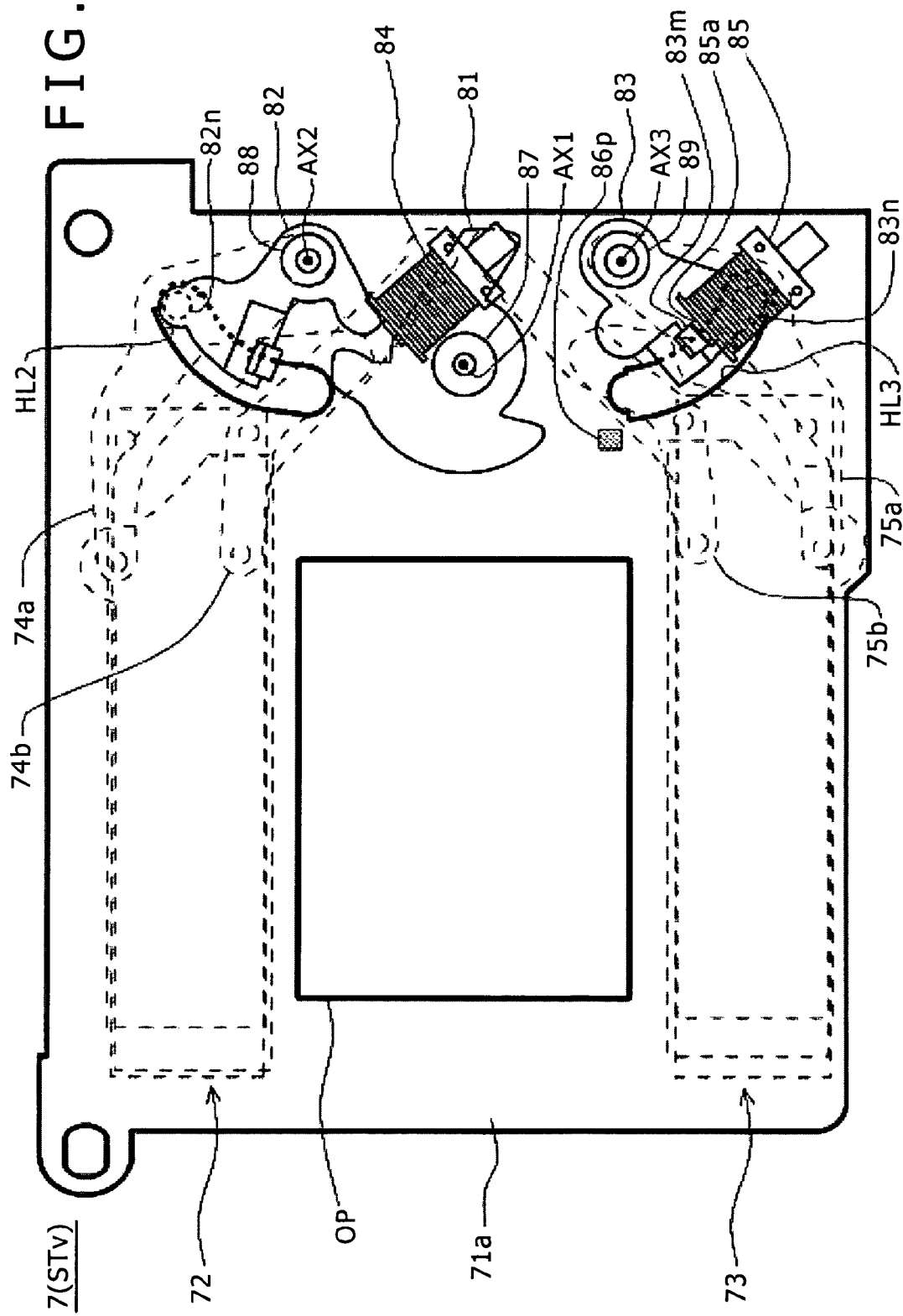
FIG. 15 illustrates the state of the shutter device encountered when the live view is executed.

When the rear curtain drive member 83 pivots counterclockwise from the state of FIG. 12 to have turning angles shown in FIGS. 13 to 15, the iron piece member 83m opposite the attracting member 85 is attracted by the attracting member 85. This prevents the pivotal shifting of the rear curtain drive member 83. The attracting member 85 is disposed such that when the rear curtain drive member 83 lies at the position shown in FIG. 15, a core attracting surface 85a of the attracting member 85 may be opposed to the iron piece member 83m.

Figure 8:
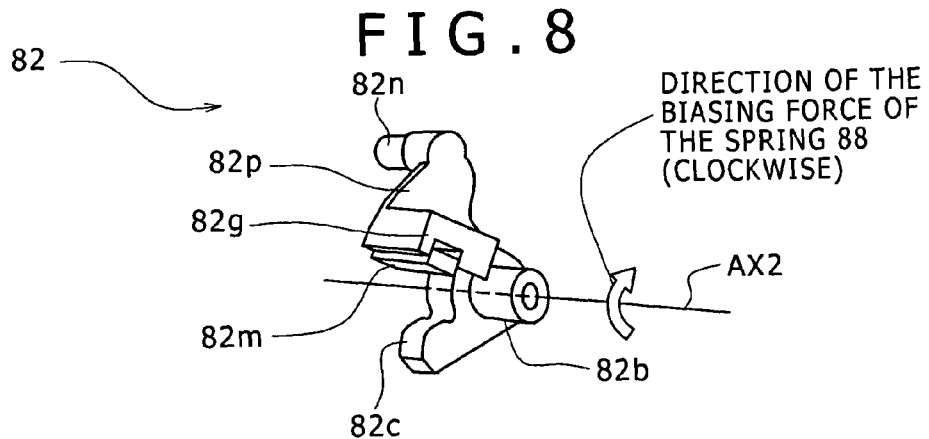
FIG. 8 is a perspective view of a front curtain drive member as a component part.

Likewise, as illustrated in FIG. 8, the front curtain drive member 82 includes a plate portion 82p, a link pin 82n, a protruding portion 82c and an upright portion 82g as well as the cylindrical upright portion 82b.

The generally sectoral front curtain drive member has a link pin 82n on the outer circumferential portion side thereof. The link pin 82n is provided on the rear surface of the plate portion 82p of the drive member 82 to extend upright toward the back therefrom. In particular, the link pin 82n is provided to pass through the elongate hole HL2 of the shutter base plate 71a and through a hole 74h (FIG. 7) provided in the arm 74a. If the link pin 82n is shifted along with the pivotal movement of the front curtain drive member 82 around the axis AX2, it permits the arm 74a to pivot around the axis AX4 (=AX2). This realizes the shifting operation of the front blade group 72a, 72b, 72c, i.e., the opening and closing operation of "the mechanical front curtain." In this way, "the front curtain" is operated in conjunction with the link pin 82n to realize the opened state (FIG. 12) of the opening OP by the mechanical front curtain and the closed state (FIG. 13) of the opening OP by the mechanical front curtain.

The front curtain drive member 82 has a protruding (a contact surface) 82c protruding toward the charge member 81. If the charge member 81 pivots clockwise, the protruding member 82c comes into contact with the protruding portion 81c of the charge member 81 to undergo a pressing force of the protruding portion 81c. The pressing force pivots the front curtain drive member 82 counterclockwise. The action of the pressing force pivots counterclockwise the front drive member 82 against the (clockwise) biasing force of the spring 88.

The plate portion 82p has an upright portion 82g close to the generally sectoral outer circumferential portion. The upright portion 82g is provided on the front surface of the plate portion 82p so as to extend upright therefrom toward the front side (on the front side of the sheet surface of FIG. 12). An iron piece member 82m is secured to the upright portion 82g.

An attracting member 84 is provided at the same position (i.e. the same height) as the iron piece member 82m in the direction vertical to the sheet surface of FIG. 12. The attracting member 84 is described later. The attracting member 84 is secured to the plate-like member 71c.

If the front curtain drive member 82 pivots counterclockwise from the state of FIG. 12 to have the turning angle shown in FIG. 13, which is described later, the iron piece member 82m opposite the attracting member 84 is attracted by the attracting member 84. This prevents the pivotal shift of the front curtain drive member 82. Incidentally, the attracting member 84 is disposed such that when the front curtain drive member 82 lies at the position shown in FIG. 13 and so on, a core attracting surface 84a of the attracting member 84 is opposed to the iron piece member 82m.

Figure 11:
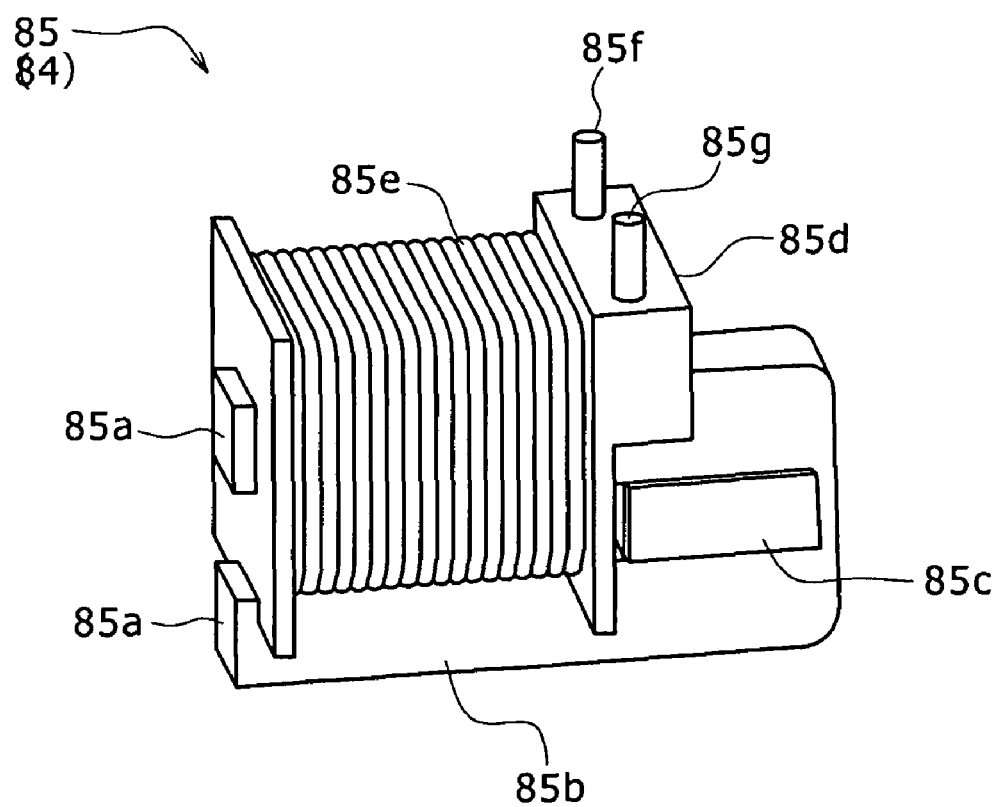
FIG. 11 is a perspective view of an attracting member.

FIG. 11 illustrates the attracting member 85. As illustrated in FIG. 11, the attracting member 85 includes a permanent magnet 85c, a core 85b, a bobbin 85d, a coil 85e and terminals 85f, 85g.

The core 85b has a general U-shape with two leg portions. The permanent magnet 85c is buried in a joint portion between both the leg portions of the core 85b. The end faces of the leg portions function as attracting surfaces 85a adapted to attract a to-be-attracted object by the magnetic force of the permanent object 85c. The attracting surface 85a is also called the core attracting surface.

One of the two leg portions of the core 85b is provided with an electromagnet. Specifically, the one leg portion is provided with the bobbin 85d around which the coil 85e is wound. The terminals 85f, 85g connected to both ends of the coil 85e are provided on the front surface of the bobbin 85d so as to project therefrom. If voltage is applied to between the terminals 85f, 85g, the coil 85e produces a magnetic flux. In short, the coil 85e and the like function as an electromagnet.

As described above, the attracting member 85 has "the permanent magnet" and "the electromagnet."

During de-energization of the electromagnet, the attracting member 85 attracts a to-be-attracted object (e.g. the iron piece member 83m) through the magnetic force of the permanent magnet 85c. Incidentally, the permanent magnet 85c and the like are also represented as an attractive force producing member which produces an attractive force.

The attracting member 85 can vary the attractive force of the core attracting surface 85a by the energization of the electromagnet (the energization of the coil 85e). Incidentally, such an electromagnet and the like are represented as an attractive force reducing member which reduces an attractive force.

More specifically, during the energization of the electromagnet, voltage generating the magnetic flux having the direction of cancelling the magnetic flux of the permanent magnet 85c is applied to the coil 85e. Thus, the attractive force of the core attracting surface 85a during the energization of the coil 85e is reduced to a level smaller than the attractive force of the core attracting surface 85a during de-energization of the coil 85e. In other words, during the energization of the electromagnet it becomes hard for the attracting member 85 to attract the to-be-attracted object. Incidentally, the attracting member 85 attracts the to-be-attracted object through the magnetic force of its own permanent magnet during de-energization of the electromagnet; therefore, it is represented as also "the self-maintaining" attracting member.

In the present embodiment, the attracting member 85 as described above is used to hold the rear curtain drive member 83 (specifically, the iron piece member 83m) through the attractive force based on the magnetic force of the permanent magnet 85c during the de-energization of the electromagnet. This intends to reduce power consumption during live view. On the other hand, the electromagnet is energized to produce the magnetic flux having the direction of cancelling the magnetic flux of the permanent magnet 85c to reduce the attractive force of the permanent magnet 85c. This releases the holding of the rear curtain drive member 83. Thus, the rear curtain drive member 83 can be driven by the biasing force of the spring 89 to immediately drive the rear curtain 73 toward the exposure end position.

Incidentally, the permanent magnet 85c of the attracting member 85 functions as a holding member for holding the rear curtain drive member 83 during the de-energization of the electromagnet. In addition, the electromagnet of the attracting member 85 functions as a holding-release member for releasing the holding of the rear curtain drive member 83 during the energization of the electromagnet. Further, the attracting member 85 is also represented as an attractive force adjusting member which adjusts the attractive force based on the magnetic force of the permanent magnet 85c to realize both functions of holding the rear curtain drive member 83 and of releasing the holding thereof.

The attracting member 84 and the attracting member 85 have the same configuration. Specifically, the attracting member 84 includes the permanent magnet 84c, core 84b, bobbin 84d, coil 84e and terminals 84f, 84g. The attracting member attracts a to-be-attracted object (e.g. the iron piece member 82m) through the magnetic force of the permanent magnet 84c during the de-energization of the electromagnet. On the other hand, during the energization of the electromagnet (during the energization of the coil 84e), voltage producing the magnetic flux having the direction of cancelling the magnetic flux of the permanent magnet 84c is applied to the coil 84e. Thus, the attractive force of the core attracting surface 84a during the energization of the coil 84e is smaller than that during the de-energization of the coil 84e. In addition, also the attracting member 84 is represented as a "self-maintaining" attracting member.

As illustrated in FIG. 9, the charge member 81 includes a plate portion 81p, a protruding portion 81c, a protruding portion 81e and a protruding portion 81f as well as the cylindrical upright portion 81b.

The protruding portion 81f comes into contact with a distal end 86p of a given link member 86.

If the distal end 86p (FIG. 12) of the link member 86 is shifted in the up-down directions of FIG. 12 (directions of arrows in FIGS. 13 and 14), the charge member 81 is pivoted around the axis AX1 to vary the turning angle of the charge member 81.

When the charge member 81 pivots clockwise, the protruding portion 81c of the charge member 81 begins to come into contact with the protruding portion 82c of the front curtain drive member 82. When undergoing the pressing force from the protruding portion 81c, the front curtain drive member 82 pivots counterclockwise around the axis AX2.

Likewise, When the charge member 81 pivots clockwise, the protruding portion 81e of the charge member 81 begins to come into contact with the protruding portion 83e of the rear curtain drive member 83. When undergoing the pressing force from the protruding portion 81e, the rear curtain drive member 83 pivots counterclockwise around the axis AX3.

Incidentally, the protruding portions 81c and 81e are also represented as "pressing portions" adapted to press the protruding portions 82c and 83e, respectively. The protruding portions 82c and 83e are also represented as "to-be-pressed portions" adapted to be pressed by the protruding portions 81c and 81e, respectively.

(5. Operation of the Shutter Device)

The operation of the shutter device 7 and the like are next described with reference to FIGS. 12 to 16 and so on. The operation of the shutter device 7 and the like are here described during shooting in the live view mode. FIG. 16 is a time chart for shooting operation in the live view mode. FIGS. 12 to 15 illustrate a series of operation of the drive mechanism 80 as mentioned earlier. FIG. 12 illustrates a state STa immediately after the completion of exposure operation for a certain actual shooting image. FIG. 13 illustrates a state STc immediately after completion of spring charge. FIG. 14 illustrates a return state Ste of the charge member 81. FIG. 15 illustrates a state STv immediately before exposure operation for the next actual shooting image in the EVF mode.

A description is first given with reference to FIG. 15. FIG. 15 illustrates the state STv of the shutter device 7 at the time of live view. As illustrated in FIG. 15, the iron piece member 83m of the rear curtain drive member 83 is attracted by the attracting member 85 (specifically the core attracting surface 85a) for stoppage. At this time, the rear curtain 73 is stopped while being maintained at the retreat position (the exposure start position) so as not to cover the opening OP. In addition, during the live view, also the front curtain 72 is stopped at the retreat position so as not to cover the opening OP. However, in this case, the iron piece member 82m of the front curtain drive member 82 is not attracted by the attracting member 84. Specifically, the front curtain drive member 82 is pivoted by undergoing the clockwise biasing force of the spring 88 and shifted to and stopped at the position where the link pin 82n is abutted against the one end side (the stop end on the upper right side in the figure) of the elongate hole HL2.

In the state STv as described above, both the front curtain and the rear curtain are retreated to the position where they do not cover the opening OP. Time-series images with respect to the object images passing through the opening OP are sequentially acquired by the image pickup element 5.

In this case, the clockwise biasing force of the spring 89 is cancelled by the attractive force based on the magnetic force of the permanent magnet 85c of the attractive member 85. Therefore, the rear curtain drive member 83 is held at the position of FIG. 15 so that the rear curtain is maintained at the exposure start position. This eliminates the energization of the attracting member 85 to hold the rear curtain drive member 83. Thus, electrical power saving can be enabled during live view.

In the state STv (FIG. 15), upon receipt of a shooting command with respect to the actual shooting image, operation is started to acquire the actual shooting image. Specifically, if the release button 11 is brought into the full-press state S2 (time T10 in FIG. 16), diaphragm adjusting operation is executed in the imaging lens unit 3. After the exposure start preparation has been completed, exposure operation is started at time T12 (FIG. 16). Time T12 is time after the elapse of a minute time from time T10 encountered when the release button 11 is brought into the full-press state S2.

The exposure operation in the EVF mode is here executed using not "the mechanical front curtain" but "the electronic front curtain."

Specifically, while the electronic front curtain begins to travel at time T12, the mechanical rear curtain begins to travel at time T14 after the elapse of a given time period (e.g. ¹⁄₁₀₀ second) as it follows the electronic front curtain. In this way, the exposure operation is executed for the exposure time period corresponding to a difference in travel start time between the electronic front curtain and the mechanical rear curtain and is completed at time T20. At time T20, the shutter device 7 has the state STa (FIG. 12).

In the time period from time T14 to time T20, transition operation from the state STv (FIG. 15) to the state STa (FIG. 12) is executed. The transition operation is first described.

Specifically, the energization of the coil 85e of the attracting member 85 is started at time T14. In response to the energization start, the coil 85e generates a magnetic force opposite in direction to that of the permanent magnet 85c. Thus, the attractive force of the core attracting surface 85a is reduced to a level smaller than the clockwise biasing force of the spring 89. Consequently, the iron piece member 83m of the rear curtain drive member 83 begins to move away from the core attracting surface 85a of the attracting member 85. In addition, the rear curtain drive member 83 pivots clockwise around the axis AX3. In this way, the holding of the rear curtain drive member 83 by the attracting member 85 is released. The energization of coil 85e is ended in the minute time and stopped again. Incidentally, the energization of the coil 85e of the attracting member 85 is carried out only at the time of allowing the rear curtain to travel, in the time period from the start of the framing operation for the actual shooting image, through the completion of the exposure operation for the actual shooting image, to the start of the framing operation for the next actual shooting image. For example, the coil 85e is energized only for partial time period from time T14 to time T20 (specifically, time T19 just before time T20), in the time period from time T5 to time T28 in FIG. 16.

The link pin 83n is shifted along the elongate hole HL3 along with the shifting operation of the rear curtain drive member 83. The link pin 83n is shifted to the upper end of the elongate hole HL3 and is stopped. See FIG. 12. As the link pin 83n is shifted, the arm 75a pivots clockwise around the axis AX7 (AX3) so that the rear blade group 73a, 73b, 73c is shifted to the exposure end position (in other words, the closing position of the opening OP). In this way, the state STa of FIG. 12 is achieved to realize the closing operation of "the rear curtain."

As described above, after the electronic front curtain has traveled, the energization of the attracting member 85 is started at the given timing to allow the rear curtain (specifically, the mechanical rear curtain in detail) to travel. In this way, the shutter operation is performed by the so-called "electronic front curtain" and "mechanical rear curtain" to realize the exposure operation in which pixels are exposed for the given time period.

As described above, the transition operation from the state STv of FIG. 15 to the state STa immediately after the exposure completion of FIG. 12 is realized.

Next, the read processing (the charge transfer processing of the image pickup element and the like) is performed to read out pixel data from the image pickup element 5 in the time period from time T20 to time T26. Incidentally, the image data of the actual shooting image is created based on the pixel data thus read out. In addition, operation for returning the diaphragm into the opened state is performed in the time period from time T20 to time T26.

The transition operation from the state STa (FIG. 12) to the state STc (FIG. 13) and the transition operation from the state STc (FIG. 13) to the state STe (FIG. 14) are sequentially performed in the time period from time T20 to time T26. Incidentally, the time period from time T20 to time T26 is also represented as the read-out time period of pixel date. In the time period, the rear curtain and the front curtain are shifted so that at least one of them may cover the opening OP to prevent the multiple exposure of the image pickup element 5.

A description is next given of the former transition operation, i.e., the transition operation from the state STa (FIG. 12) to the state STc (FIG. 13). The former transition operation is performed in the time period from time T20 to time T22.

If the distal end 86p of the link member 86 is shifted upward in FIG. 12 while being in contact with the protruding portion 81f of the charge member 81, the charge member 81 is shiftably pivoted clockwise around the axis AX1.

Along with the pivoting movement the protruding portion 81c presses the protruding portion 82c of the front curtain drive member 82, that is, the pressing force is transmitted to the front curtain drive member 82. The pressing force permits the front curtain drive member 82 to begin to pivot counterclockwise around the axis AX2. The pivoting movement of the front curtain drive member 82 is stopped after the iron piece member 82m has been abutted against and attracted by the core attracting surface 84a of the attracting member 84. See FIG. 13. The pivoting movement increases the biasing force of the spring 88. In other words, the spring 88 is charged. Incidentally, in the pivoting movement of the front curtain drive member 82, the plate portion 81p of the charge member 81 passes through between the plate portion 82p of the front curtain drive member 82 and the shutter base plate 71a so that the plate portion 81p and the plate portion 82p are prevented from interfering with each other.

In response to the pivoting movement of the front curtain drive member 82 as described above, the link pin 82n is shifted along the arcuate elongate hole HL2 so that the arm 74a is pivoted counterclockwise around the axis AX4 (=AX2). This shifts the front blade group 72a, 72b, 72c to a position below the opening OP. In short, the closing state of the opening OP by "the mechanical front curtain" is realized. Incidentally, the attracting member 84 attracts the iron piece member 82m through the attractive force of the permanent magnet 84c. Thus, under the de-energization state of the coil 84e, the front curtain drive member 82 and the front curtain 72 continue to stop.

In this way, the shifting operation of the front curtain drive member 82 and the front curtain 72 is performed along the pivoting movement of the charge member 81.

Along with the pivoting movement of the charge member 81, also the shifting operation of the rear curtain drive member 83 and the rear curtain 73 is performed simultaneously with (parallel to) the above-mentioned shifting operation of the front curtain drive member 82 and the front curtain 72.

Specifically, when the protruding portion 81e begins to press the protruding portion 83e of the rear curtain drive member 83, the rear curtain drive member 83 begins to be pivoted counterclockwise around the axis AX3 by the pressing force transmitted to the rear curtain drive member 83 from the charge member 81. The pivoting movement of the rear curtain drive member 83 stops after the iron piece member 83m is abutted against and attracted by the core attracting surface 85a of the attracting member 85. See FIG. 13. This pivoting movement increases the biasing force of the spring 89. In other words, the spring 89 is charged.

In response to the pivoting movement of the rear curtain drive member 83 as described above, the link pin 83n is shifted along the arcuate elongate hole HL3 so that the arm 75a is pivoted counterclockwise around the axis AX7 (=AX3). Thus, the rear blade group 73a, 73b, 73c is shifted to the position below the opening OP, i.e., the exposure start position (in other words, the opened position of the opening OP). Incidentally, the attracting member 85 attracts the iron piece member 83m through the magnetic force of the permanent magnet 85c. Therefore, the rear curtain drive member 83 and the rear curtain 73 continue to stop under the de-energization state of the coil 85e. In other words, the rear curtain drive member 83 and the rear curtain 73 are held at the position of FIG. 13 by the magnetic force of the permanent magnet 84c.

The shifting operation of the rear curtain 73 as describe above is performed simultaneously with the shifting operation of the front curtain 72. Specifically, the rear curtain 73 and the front curtain 72 are shifted so that at least one of them covers the opening OP. This prevents the multiple exposure of the image pickup element 5. More specifically, it is preferred that the shifting operation of the rear curtain 73 and that of the rear curtain 72 be performed simultaneously with each other in the state where the rear curtain 73 and the front curtain 72 constantly have an overlapping portion.

A description is next given of transition operation from the state STc (FIG. 13) to the state STe (FIG. 14). In the transition operation, the resetting operation of the charge member 81 is performed in the time period from time T22 to time T24.

Specifically, the distal end 86p of the link member 86 shifts downward in FIG. 14. In response to this downward shift, the pressing force from the link member 86 to the charge member 81 is reduced; therefore, the counterclockwise biasing force of the spring 87 shiftably pivots the charge member 81 around the axis AX1 counterclockwise.

Also in the state STe, the iron piece member 82m is continuously attracted by the core attracting surface 84a through the magnetic force of the permanent magnet 84c. In addition, the iron piece member 83m is continuously attracted by the core attracting surface 85a of the attracting member 85 through the magnetic force of the permanent magnet 85c. Thus, in the de-energization state of the coil 84e, the front curtain drive member 82 and the front curtain 72 continue to stop. In the de-energization state of the coil 85e, the rear curtain drive member 83 and the rear curtain 73 continue to stop. In addition, the charge member 81 moves away from the rear curtain drive member 83 as well as from the front curtain drive member 82. In other words, the charge member 81 shifts to the retreat position. Also after the charge member 81 has retreated to the retreat position, the rear curtain drive member 83 is continuously held at the given position through the magnetic force of the permanent magnet 85c. Incidentally, this holding operation continues at least for the time period from a time point when the charge member 81 begins to shift to its retreat position, to a time point when the reading processing of the pixel data of the actual shooting image is ended, which is described later.

Thereafter, the processing for reading pixel date from the image pickup element 5 (the charge transfer processing of the image pickup element, etc.) is ended. Then, returning operation to the state STv is started at time T26 (FIG. 16). In other words, transition operation from the state STe (FIG. 14) to the state STv (FIG. 15) is executed. This transition operation is next described.

Specifically, at time T26, energization of the coil 84e of the attracting member 84 is started. In response to the start of the energization, the coil 84e generates a magnetic flux opposite in direction to the magnetic flux of the permanent magnet 84c. This reduces the attractive force of the core attracting surface 84a to a level smaller than that of the clockwise biasing force of the spring 88.

Consequently, the iron piece member 82m of the front curtain drive member 82 begins to move away from the core attracting surface 84a of the attracting member 84 and the front curtain drive member 82 pivots clockwise around the axis AX2. Along with the shifting operation of the front curtain drive member 82, the link pin 82n is shifted along the elongate hole HL2. The link pin 82n is shifted to and stops at the upper right end of the elongate hole HL2. See FIG. 15. As the link pin 82n is shifted, the arm 74a is pivoted clockwise around the axis AX4 (AX2) to shift the front blade group 72a, 72b, 72c to the upper position of the opening OP (time T28), which corresponds to the position where the front blade group 72a, 72b, 72c does not cover the opening OP). In this way, the state STe is shifted to the state STv (FIG. 15) to realize the opened state of the opening OP.

After time T28 when the shifting operation of the front curtain 72 is completed as described above, live view operation is executed. Specifically, the time-series images with respect to the object images passing through the opening OP are sequentially acquired by the image pickup element 5. Thus, the time-series images are sequentially displayed on the rear monitor 12.

According to the operation described above, during the live view operation, the iron piece member 83m of the rear curtain drive member 83 is attracted by the magnetic force of the permanent magnet 85c of the attracting member 85. Therefore, it is not necessary to energize the attracting member 85 in order to hold the rear curtain drive member 83. Thus, electric power saving can be enabled during live view. In particular, because of very long time period of live view, an effect of reducing electric power consumption during the live view is significantly large.

Such an effect is further described.

As a comparative example, a technology is here assumed that performs live view using the shutter device as described in Patent Document 1. This shutter device maintains the rear curtain at the exposure start position along with the energization of the electromagnet. FIG. 17 is a timing chart illustrating the operation of the shutter device of the comparative example.

In such a comparative example shown in FIG. 17, the live view operation after time T28 needs to continue the energization of the electromagnet in order to maintain the rear curtain at the exposure start position. Power consumption resulting from such energization is great.

On the other hand, the image pickup apparatus according to the embodiment described above can maintain the rear curtain at the exposure start position without the energization of the electromagnet in the live view operation after time T28. Thus, power consumption can be reduced compared with the above comparative example.

The technology described in Patent Document 2 needs to set, after the depression of the release button, time for releasing the holding of the rear curtain drive member through the pressing force. Specifically, operation for once shifting, to the retreat position, the charge member applying the pressing force to the rear curtain drive member is performed after the release button depression (the full-press state S2). This poses a problem of extending the so-called release time-lag. For example, the time needed to release the holding of the rear curtain drive member may be longer than the time (time period from time T10 to time T12) needed for the diaphragm changing operation described above. In such a case, the so-call release time-lag is increased.

In contrast to this, the image pickup apparatus 1 according to the embodiment holds the rear curtain drive member 83 by means of the permanent magnet 85c. That is to say, it does not have the rear curtain holding mechanism using the pressing force as in the technology described in Patent Document 2. This does not need to set the time for releasing the holding of the rear curtain drive member. Basically after the release button 11 has been brought into the full-press state S2, the image pickup apparatus 1 according to the embodiment described above starts the energization of the coil 85e of the attracting member 85 to immediately start the travel of the rear curtain. Thus, it is possible to avoid an increase in the so-called release time-lag. Incidentally, the embodiment described above exemplifies the case where the exposure operation is started after the completion of the diaphragm changing operation. Also such a case can suppress the release time-lag to the minimum (time needed for the diaphragm changing operation).

(6. Others)

The embodiment of the invention has been described thus far. However, the invention is not limited to the contents described above.

For example, the embodiment exemplifies the case where the exposure operation is started by allowing the electronic front curtain to travel in a pseudo manner (the operation in which the image pickup element 5 sequentially executes reset operation for each line in a predefined direction). However, the invention is not limited to this. Specifically, the exposure operation may be started by allowing the mechanical front curtain to travel actually (physically). In the other words, the exposure operation with respect to the actual shooting image may involve the electronic front curtain or the mechanical front curtain.

The embodiment exemplifies the case where the front curtain 72 is maintained at the position of FIG. 15 using the magnetic force of the permanent magnet of the attracting member 84. However, the invention is not limited to this. For example, the front curtain 72 is maintained at the position of FIG. 15 using the attracting member having not the permanent magnet but an electromagnet. In short, the front curtain 72 may be maintained at the position of FIG. 15 by the energizing the electromagnet to generate a magnetic force (attractive force).

The embodiment exemplifies the case of executing the operation for changing the aperture value. See FIG. 16. However, the invention is not limited to this. For example, while the aperture value is fixed to a given value (the open value of the imaging lens unit or the like), the above-mentioned concept may be applied if the aperture value is not changed in the actual shooting operation. Especially in this case, since it is not necessary to execute the changing operation of the aperture value, the exposure operation can be started immediately after the release button 11 has been brought into the full-press state S2.

For example, if the aperture value is set at the open value of the imaging lens unit 3 in the aperture priority mode, exposure operation for an actual shooting image with respect to the image pickup element is made to start immediately in response to a shooting start instruction from an operator. After the elapse of a given time (time corresponding to shutter speed) from the start of the exposure operation, the energization of the electromagnet of the attracting member 85 is started to start the travel of the rear curtain.

In particular, this case does not involve the changing operation (time T10 to time T12) of the aperture value as in FIG. 16. Therefore, the exposure operation can be started immediately after the release button 11 has been brought into the full-press state S2. In other words, it is possible to reduce the release time-lag to significantly minute time (ideally zero).

Incidentally, the rear curtain may be held by the pressing force of the rear curtain holding mechanism as in the technology described in Patent Document 2. In such a case, it is necessary to set the time for releasing the holding of the holding mechanism even if the aperture value changing operation is not involved. In other words, unnecessary time-lag occurs even if the operation of changing the aperture value is not involved.

In contrast to this, the technology of the modification described above can immediately start the exposure operation before the completion of the holding-release operation. Therefore, the occurrence of unnecessary release time-lag as described above can be avoided.

The embodiment described above exemplifies the case where the concept of the invention is applied to the framing operation at the time of shooting a still image. However, the invention is not limited to this. The concept described above can be applied to shooting a moving image other than the live view image.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   a shutter device;
   an image pickup element adapted to sequentially acquire time-series images regarding object images passing through an exposure opening of the shutter device; and
   control means for controlling operation of the shutter device and operation of the image pickup element;
   wherein the shutter device includes
   a rear curtain traveling from an exposure start position to an exposure end position and then covering the opening,
   a rear curtain drive member allowing the rear curtain to travel from the exposure start position to the exposure end position,
   biasing force application means for applying a biasing force to the rear curtain drive member, the biasing force being adapted to shift the rear curtain in a direction from the exposure start position toward the exposure end position,
   holding means for holding the rear curtain drive member against the biasing force through an attractive force based on an magnetic force of a permanent magnet, and
   holding-releasing means for releasing the holding of the rear curtain drive member by allowing energization of an electromagnet to generate a magnetic flux having a direction of cancelling a magnetic flux of the permanent magnet to reduce the attractive force,
   the control means allows the image pickup element to acquire the time-series images regarding the object image passing through the opening, in a state where the rear curtain drive member is held at a given position by being attracted by the holding means through the attractive force based on the magnetic force of the permanent magnet and the rear curtain is maintained at the exposure start position, and
   the control means allows the energization of the electromagnet to start at given timing after issuance of a shooting instruction regarding an actual shooting image to release the holding of the rear curtain drive member and allows the rear curtain through the biasing force to travel from the exposure start position to the exposure end position,
   wherein the shutter device further includes a charge member adapted to increase the biasing force by shifting the rear curtain drive member to the given position,
   an attracting surface of the holding means is disposed at a position opposed to a to-be-attracted member of the rear curtain drive member when the rear curtain drive member is at the given position, and
   the charge member shifts the rear curtain drive member to the given position to allow the to-be-attracted member to be attracted to the attractive surface through the magnetic force of the permanent magnet, thereby holding the rear curtain drive member at the given position through the magnetic force of the permanent magnet.

2. The image pickup apparatus according to claim 1,
   wherein the charge member shifts the rear curtain drive member to the given position to thereby charge the biasing force and then is shifted to a given retreat position, and
   the holding member holds the rear curtain drive member at the given position through the magnetic force of the permanent magnet in a time period from a point of time when the charge member begins to shift to the given retreat position to a point of time when processing for reading out pixel data of the actual shoot image is ended.

3. The image pickup apparatus according to claim 2,
   wherein the control means energizes the electromagnet only when the rear curtain is allowed to travel in a time period from beginning of framing operation regarding the actual shooting image, through completion of exposure operation regarding the actual shooting image, to beginning of framing operation regarding a next actual shooting image.

4. The image pickup apparatus according to claim 1,
   when an aperture value is set at an open value of an imaging lens in an aperture priority mode, the control means immediately starts exposure operation of an actual shooting image regarding the image pickup element in response to photographing start instruction from an operator and starts energization of the electromagnet after a lapse of a given time from the start of the exposure operation to start traveling of the rear curtain.

5. An image pickup apparatus comprising:
   a shutter device;
   an image pickup element adapted to sequentially acquire time-series images regarding object images passing through an exposure opening of the shutter device; and
   control means for controlling operation of the shutter device and operation of the image pickup element;
   wherein the shutter device includes
   a rear curtain traveling from an exposure start position to an exposure end position and then covering the opening,
   a rear curtain drive member allowing the rear curtain to travel from the exposure start position to the exposure end position,
   biasing force application means for applying a biasing force to the rear curtain drive member, the biasing force being adapted to shift the rear curtain in a direction from the exposure start position toward the exposure end position, and
   attractive force adjusting means, having a permanent magnet and an electromagnet, for holding, against the biasing force, the rear curtain drive member through an attractive force based on a magnetic force of the permanent magnet, and allowing energization of the electromagnet to generate a magnetic flux having a direction of cancelling a magnetic flux of the permanent magnet to reduce the attractive force, thereby releasing the holding of the rear curtain drive member,
   the control means allows the image pickup element to acquire the time-series images regarding the object image passing through the opening, in a state where the rear curtain drive member is held at a given position by being attracted by the holding means through the attractive force based on the magnetic force of the permanent magnet so that the rear curtain is maintained at the exposure start position, and
   the control means allows the energization of the electromagnet to start at given timing after issuance of a shooting instruction regarding an actual shooting image to release the holding of the rear curtain drive member and allows the rear curtain through the biasing force to travel from the exposure start position to the exposure end position, wherein the shutter device further includes a charge member adapted to increase the biasing force by shifting the rear curtain drive member to the given position, an attracting surface of the attractive force adjusting means is disposed at a position opposed to a to-be-attracted member of the rear curtain drive member when the rear curtain drive member is at the given position, and the charge member shifts the rear curtain drive member to the given position to allow the to-be-attracted member to be attracted to the attractive surface through the magnetic force of the permanent magnet, thereby holding the rear curtain drive member at the given position through the magnetic force of the permanent magnet.

* * * * *